(12) United States Patent
Choi

(10) Patent No.: US 11,000,022 B2
(45) Date of Patent: May 11, 2021

(54) LURE

(71) Applicant: DUEL CO., INC., Fukuoka (JP)

(72) Inventor: Eric Eun-Ha Choi, Fukuoka (JP)

(73) Assignee: DUEL CO., INC., Fukuoka (JP)

( * ) Notice: Subject to any disclaimer, the term of this patent is extended or adjusted under 35 U.S.C. 154(b) by 721 days.

(21) Appl. No.: 15/560,229

(22) PCT Filed: May 24, 2017

(86) PCT No.: PCT/JP2017/019317
§ 371 (c)(1),
(2) Date: Sep. 21, 2017

(87) PCT Pub. No.: WO2018/003354
PCT Pub. Date: Jan. 4, 2018

(65) Prior Publication Data
US 2018/0249692 A1    Sep. 6, 2018

(30) Foreign Application Priority Data

Jun. 30, 2016  (JP) .............................. JP2016-131120

(51) Int. Cl.
*A01K 85/16*    (2006.01)
*A01K 85/00*    (2006.01)
*A01K 95/00*    (2006.01)

(52) U.S. Cl.
CPC .............. *A01K 85/16* (2013.01); *A01K 85/00* (2013.01); *A01K 95/005* (2013.01)

(58) Field of Classification Search
CPC ........ A01K 85/00; A01K 85/01; A01K 85/16; A01K 85/18; A01K 95/005
See application file for complete search history.

(56) References Cited

U.S. PATENT DOCUMENTS

| 6,671,996 B1 * | 1/2004 | Ito .......................... A01K 85/16 43/42.31 |
| 2003/0093939 A1 | 5/2003 | Salonen et al. |
| 2012/0324778 A1 * | 12/2012 | Choi ...................... A01K 85/00 43/42.22 |

FOREIGN PATENT DOCUMENTS

| JP | 11-113449 A | 4/1999 |
| JP | 3202084 U | 1/2016 |
| WO | 2014/119406 A1 | 8/2014 |

OTHER PUBLICATIONS

International Search Report dated Aug. 8, 2017, issued in counterpart application No. PCT/JP2017/019317. (3 pages).

* cited by examiner

*Primary Examiner* — Thanh Pham
(74) *Attorney, Agent, or Firm* — Westerman, Hattori, Daniels & Adrian, LLP

(57) ABSTRACT

A lure includes a body, a passage formed in the body, a plurality of independent spherical sinkers that moves in the passage, a holding member that holds the plurality of spherical sinkers together, and an attachment portion to which the spherical sinker which is located foremost and held by the holding member is attached by a magnetic force.

According to the lure of the present invention, the plurality of spherical sinkers can be integrally and smoothly moved in the passage.

6 Claims, 25 Drawing Sheets

LURE

TECHNICAL FIELD

The present invention relates to a lure having the center of gravity that can be changed with movement of spherical sinkers.

BACKGROUND ART

A lure as disclosed in Patent Document 1 has been conventionally known. The conventional lure includes a body, a passage that is a sinker moving space extending in the fore and back direction of the body, a plurality of spherical sinkers that is housed in the passage, and is movable along the passage in the fore and back direction, and a magnet provided on the front portion of the passage.

When the lure is cast, all of the spherical sinkers are away from the magnet, and move to the back portion of the body. Accordingly, the center of gravity moves to the back portion of the lure, such that the lure can be stably shot further. On the contrary, when the lure lands on the water, all of the spherical sinkers moves to the front portion of the body, and are attached to the magnet and held there. Thus, the center of gravity moves to the front portion of the lure, and the lure swims with the back portion swinging laterally.

However, since each of the spherical sinkers is independent, after landing on the water, the spherical sinker on the back side among the plurality of spherical sinkers attached to the magnet may be disadvantageously detached. To prevent this situation, when a magnet having a strong magnetic force is used, an external hook and so on may be attached to a portion of the outer face of the body near the magnet, which leads to another problem.

FIG. 13 to FIG. 17 in Patent Document 2 illustrate three spheres 46B (spherical sinkers) united using a rectangular holding plate 46A. Specifically, the holding plate 46A is a rectangular plate member, and has three circular holes for receiving the spheres 46B. By fitting the spheres 46B into the respective circular holes of the holding plate 46A, the three spheres 46B are united via the holding plate 46A. A pair of left bottom wall 3c and right bottom wall 3d is provided on the bottom of a space (passage) 3 with a gap 3b extending in the fore and back direction therebetween. The bottom walls 3c, 3d are inclined faces, against which both sides of the spheres 46B abut. A long hole 3e extending in the fore and back direction is formed on the upper side of the space 3. The gap 3b is a lower groove formed in the lower face of the passage, and the long hole 3e is an upper groove formed in the upper face of the passage.

By bringing the lower long side of the holding plate 46A into contact with the gap 3b (lower groove) and the upper long side of the holding plate 46A into contact with the long hole 3e (upper groove), the holding plate 46A holding the spheres 46B is housed in the space 3. The upper and lower long sides of the holding plate 46A slide along the gap 3b (lower groove) and the long hole 3e (upper groove), such that the holding plate 46A holding the spheres 46B moves in the space 3 in the fore and back direction.

However, in the lure described in Patent Document 2, the holding plate 46A holding the spheres 46B moves while the long side of the holding plate 46A in the gap 3b (lower groove) comes into contact with both walls of the lower groove. Thus, the holding plate 46A may not smoothly move, and causes a large sliding sound during movement. Further, since the holding plate 46A moves while the long side comes into contact with the both walls of the lower groove, during use of the lure, the both walls are shaved by the long sides of the holding plate 46A. This reduces the product lifetime of the lure.

Since the short side of the holding plate 46A is always larger than the diameter of the spheres 46B, in order to house the holding plate 46A, the body of the lure becomes necessarily large.

Additionally, with the configuration described in Patent Document 2, the gap 3b and the long hole 3e need to be formed on the upper and lower sides of the space 3. When it is attempted to form the gap 3b on the lower side of the space 3, the space 3 is disposed above the gap 3b. For this reason, it is difficult to design to locate the center of gravity of the lure at the lowest possible position.

[Patent Document 1] WO 2014/119406 A1
[Patent Document 2] JP H11-113449 A

SUMMARY OF THE INVENTION

An object of the present invention is to provide a lure that can integrally and smoothly move a plurality of spherical sinkers in a passage, and can be applied to a relatively small body.

A lure according to the present invention includes: a body; a passage formed in the body in a fore and back direction, the passage having a lower face; a plurality of spherical sinkers that moves in the passage, the plurality of spherical sinkers being independent of each other, aligned in the fore and back direction and housed in the passage; a holding member that holds the plurality of spherical sinkers together such that the spherical sinker located foremost and the spherical sinker located backmost each independently rotate while being in point-contact with the lower face of the passage; and an attachment portion provided on the passage, wherein the spherical sinker which is located foremost and held by the holding member is attached to the attachment portion by a magnetic force.

In a preferable lure according to the present invention, a fore end of the spherical sinker located foremost is exposed from the holding member, and the fore end of the spherical sinker is attached to the attachment portion.

In a preferable lure according to the present invention, the passage has an upper face and the lower face that are formed in the body in the fore and back direction, an upper end and a lower end of the spherical sinker located foremost, and an upper end and a lower end of the spherical sinker located backmost each are exposed from the holding member.

In a preferable lure according to the present invention, the passage is configured of the upper face, the lower face, a left face, and a right face that are formed in the body in the fore and back direction, and a left end and a right end of the spherical sinker located foremost, and a left end and a right end of the spherical sinker located backmost each are exposed from the holding member.

In the lure of the present invention, the plurality of spherical sinkers can be integrally moved in the passage. Therefore, the present invention can provide the lure with the center of gravity that can reliably move to the back or front side.

Further, in the lure of the present invention, the spherical sinkers smoothly move, preventing a large sound during movement. Additionally, the body of the lure of the present invention can be made relatively small.

The present invention will be described below with reference to figures.

In this specification, following expressions: fore and back, left and right, upper and lower are used to indicate direction. The front side refers to the side on which the lure during use is connected to a line (fishing line), and is pulled by the line, and the back side is opposite to the front side. The left side refers to the left side when the lure is viewed from front, and the right side is opposite to the left side. The upper side is the upper side when the lure is viewed from front, and the lower side is opposite to the upper side.

In this specification, a numerical range of "lower limit X to upper limit Y" means the lower limit X or more, and the upper limit Y or less. In the case where a plurality of numerical ranges is described, any lower limit and any upper limit may be selected to set a numerical range of "any lower limit to any upper limit".

First Embodiment

Figure 1:
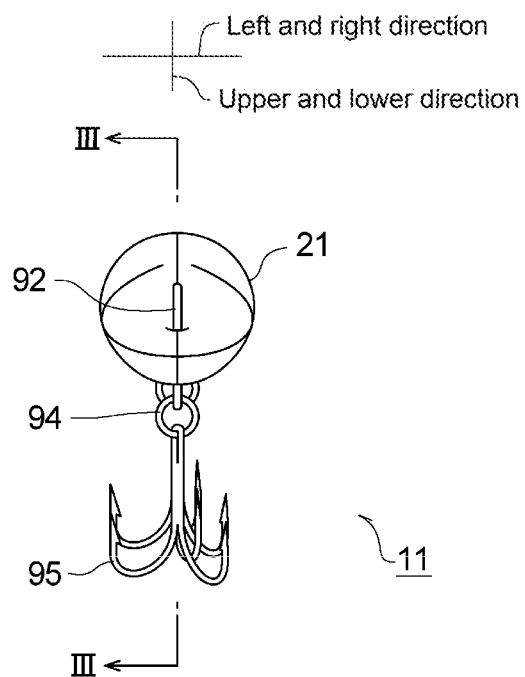
FIG. 1 is a front view of a lure according to First embodiment of the present invention.
Figure 2:
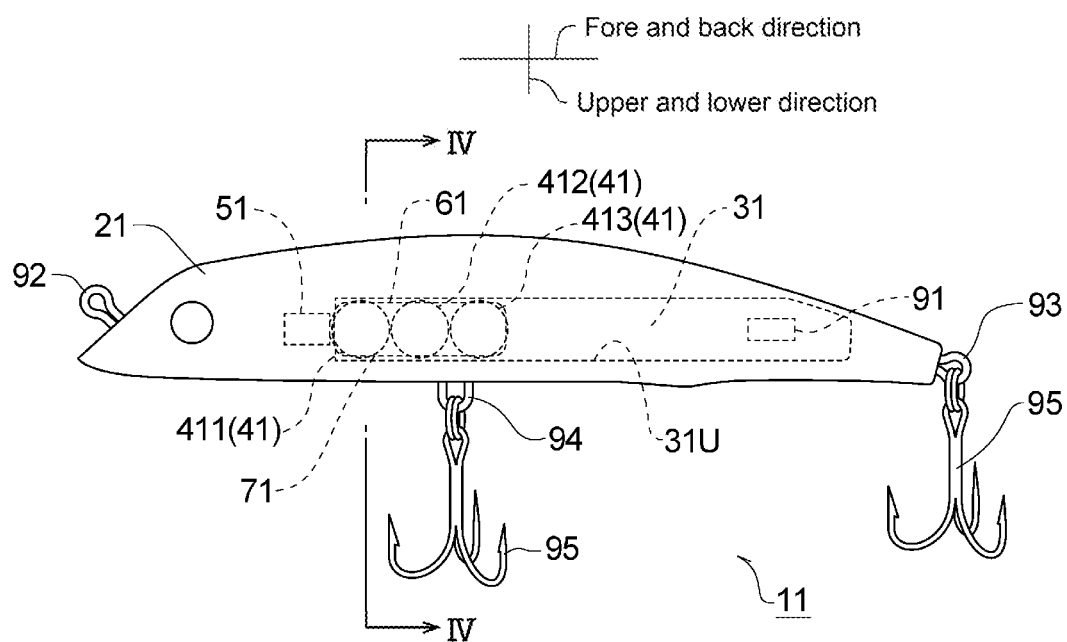
FIG. 2 is a side view of the lure.
Figure 3:
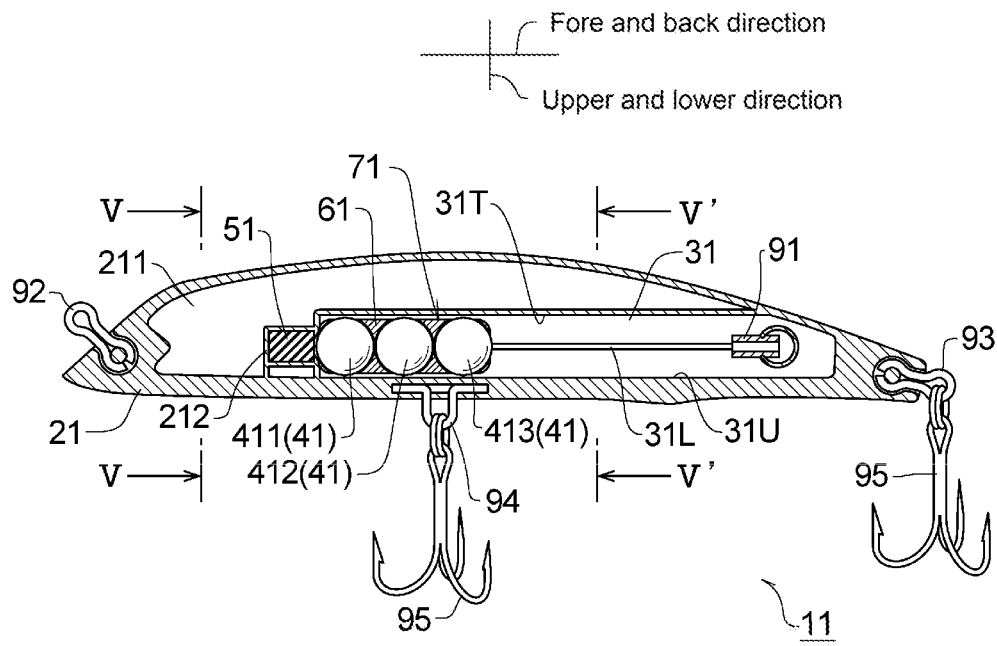
FIG. 3 is a lateral sectional view of the lure taken along a line III-III in FIG. 1. Spherical sinkers, a fish hook, and a connection portion are not illustrated in cross section (This also applies to all sectional views).
Figure 4:
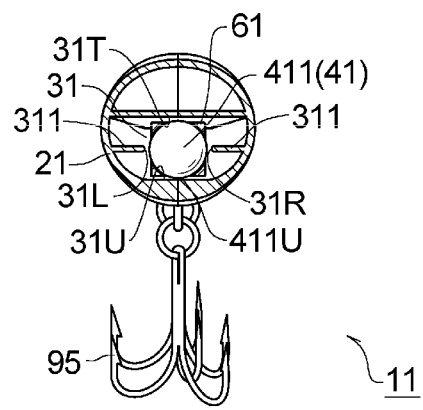
FIG. 4 is a vertical sectional view taken along a line IV-IV in FIG. 2.
Figure 5:
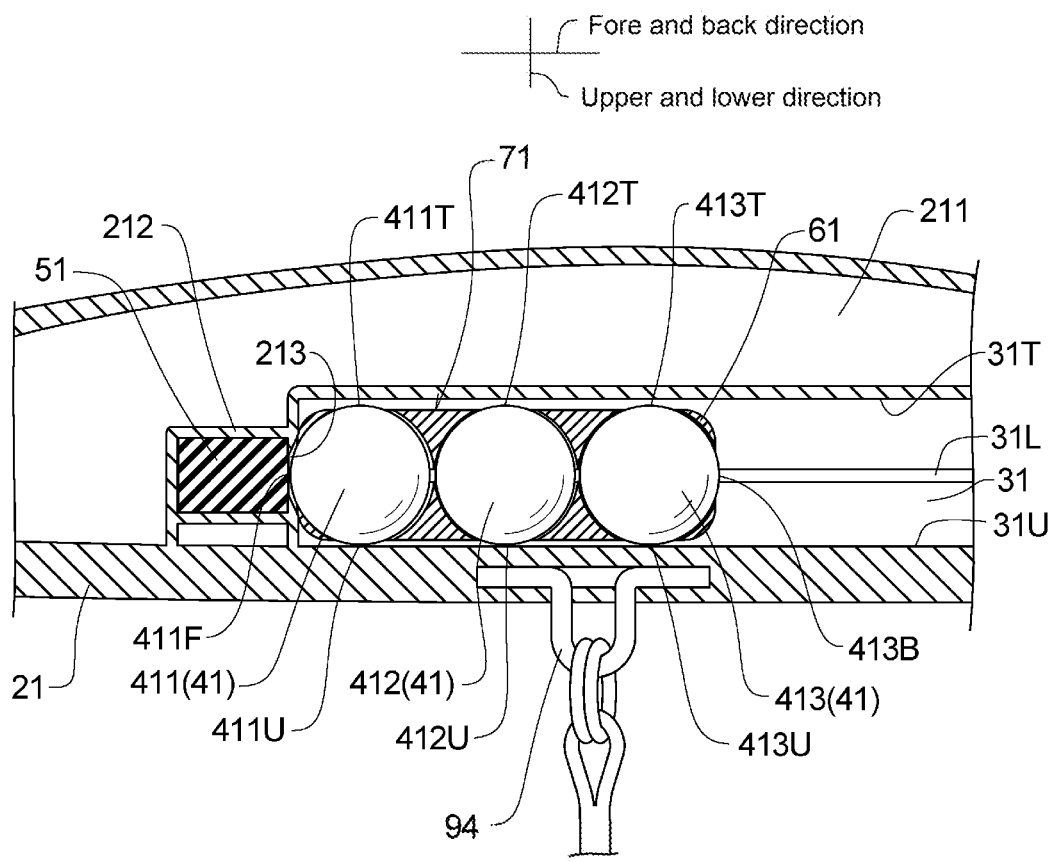
FIG. 5 is an enlarged lateral sectional view enlarging V-V section in FIG. 3.
Figure 6:
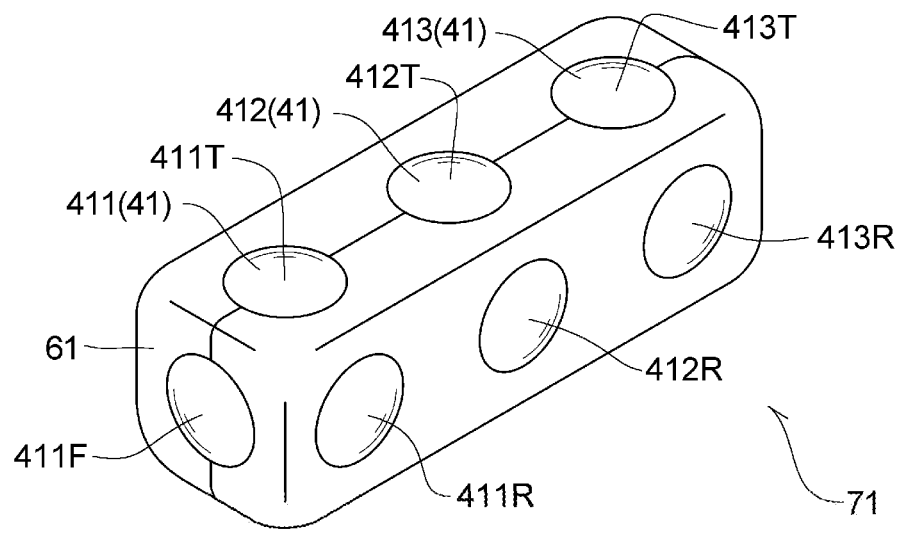
FIG. 6 is a perspective view illustrating a holding member and a plurality of spherical sinkers (united sinker) held by the holding member.
Figure 7:
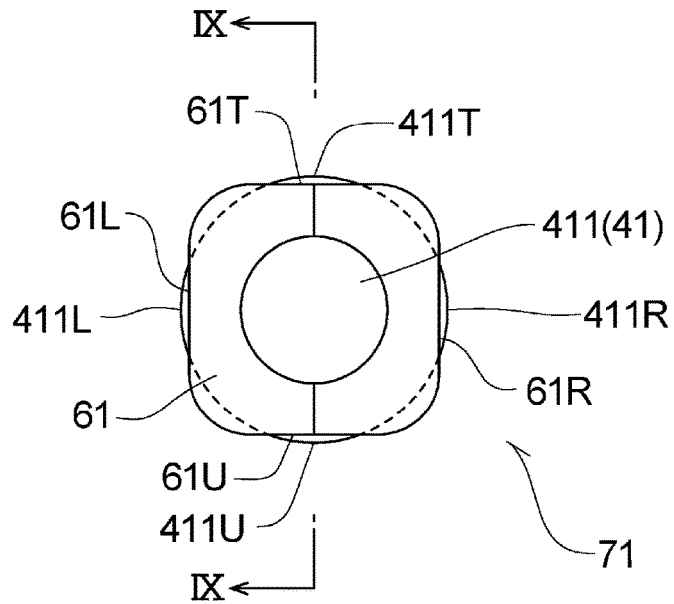
FIG. 7 is a front view of the united sinker.
Figure 8:
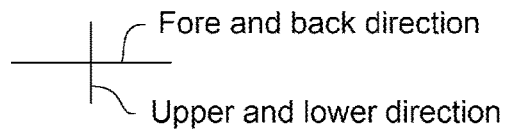
FIG. 8 is a side view of the united sinker.
Figure 8:
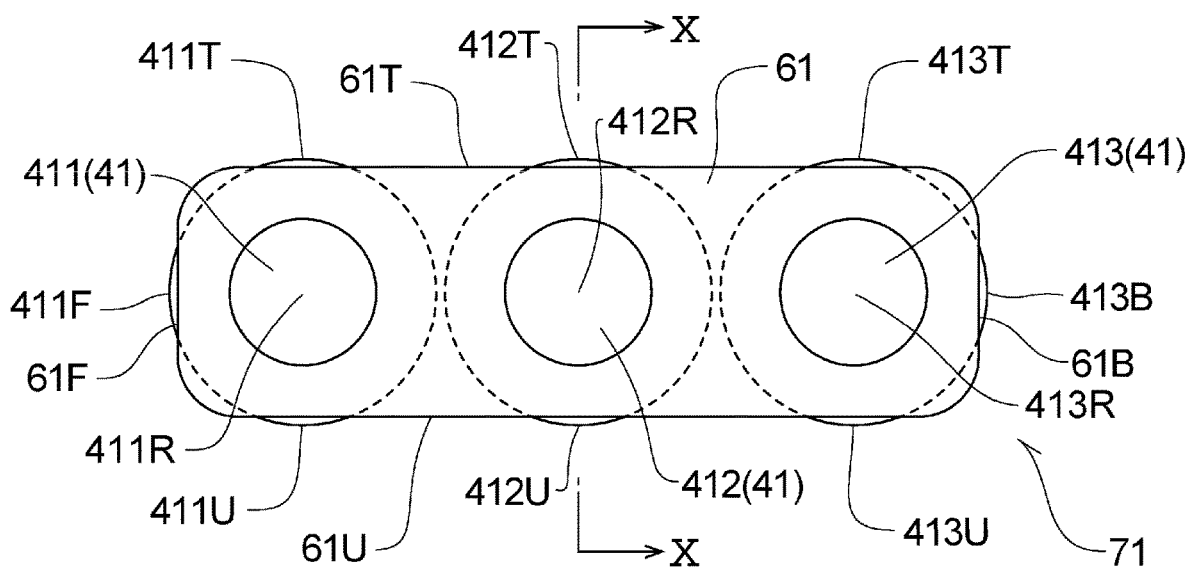
Figure 9:
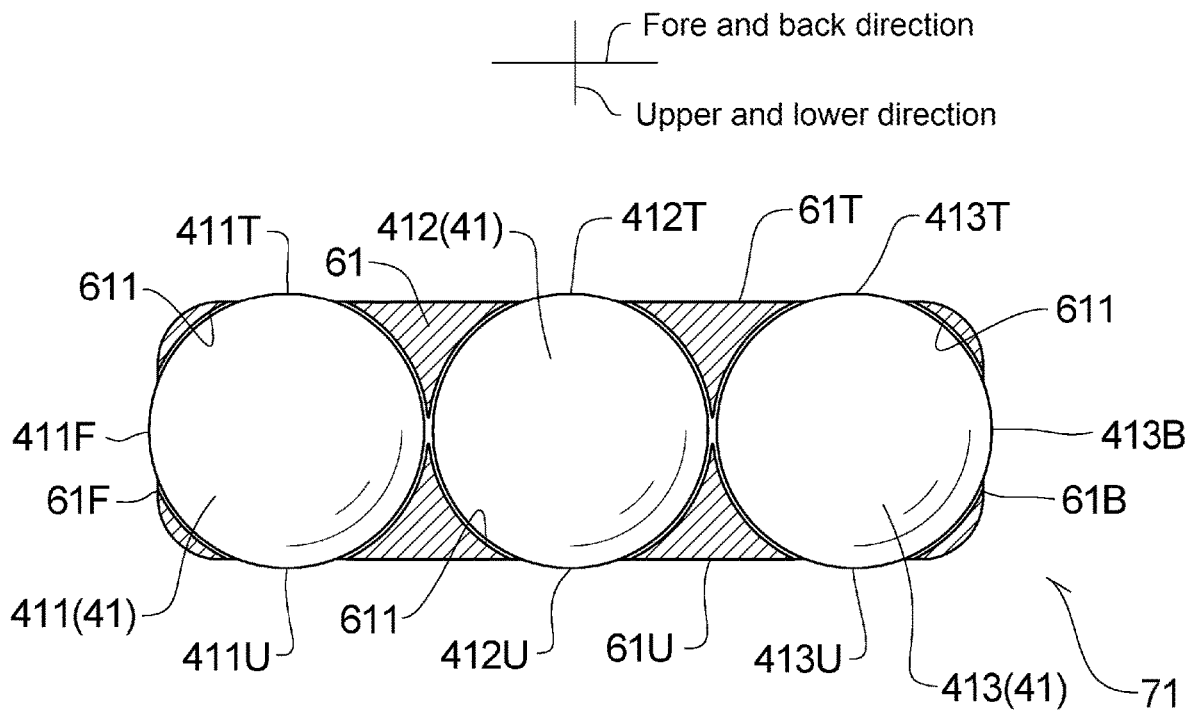
FIG. 9 is a lateral sectional view taken along a line IX-IX in FIG. 7.
Figure 10:
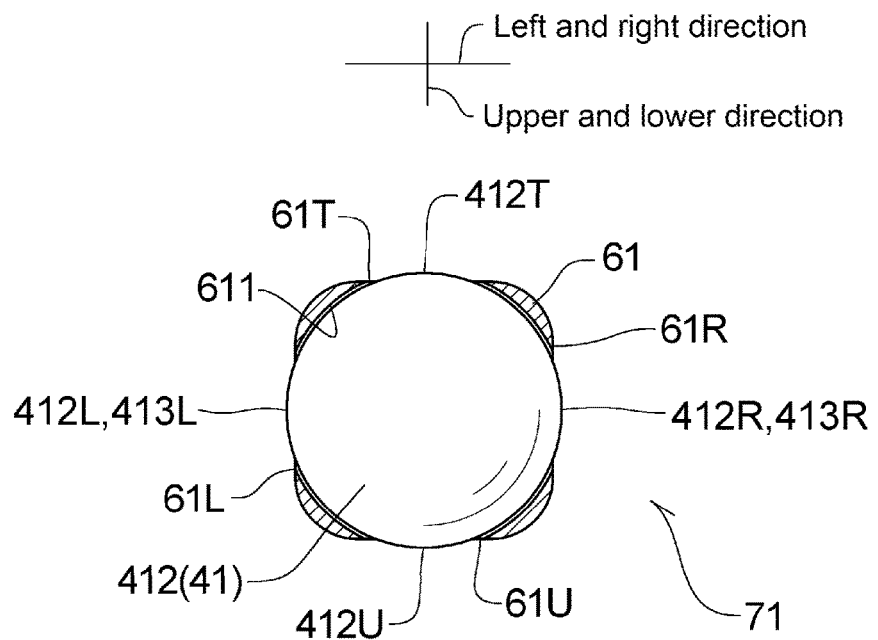
FIG. 10 is a vertical sectional view taken along a line X-X in FIG. 8.

FIG. 1 is a front view of a lure of the present invention when viewed from the front side, FIG. 2 is a side view of the lure in FIG. 1 when viewed from the right side, FIG. 3 is a sectional view of the lure taken in the fore and back direction, FIG. 4 is a sectional view of the lure taken in the left and right direction at the lateral center, and FIG. 5 is an enlarged sectional view of a main part of the lure.

In FIG. 1 to FIG. 5, a lure 11 has a body 21, a passage 31 formed in the body 21, a plurality of spherical sinkers 41 housed in the passage 31, an attachment portion 51 provided on the passage 31, and a holding member 61 that holds the plurality of spherical sinkers 41 together. The plurality of spherical sinkers 41 held by the holding member 61 moves in the passage 31 without separately moving. Hereinafter, the holding member 61 and the plurality of spherical sinkers 41 held by the holding member 61 may be collectively referred to as a "united sinker".

The lure 11 of the present invention may include components other than the body 21 having the passage 31, the attachment portion 51, and the united sinker 71 (the holding member 61 and the plurality of spherical sinkers 41).

Hereinafter, each component of the lure 11 of the present invention will be described in detail.

<Body and Passage>

The illustrated body 21 simulates a small fish in appearance. The body 21 may simulate a shrimp, a frog, and so on other than a small fish. The body 21 also may simulate any shape other than natural objects including a small fish.

The body 21 may have an infinite number of small dents (dimples) (not illustrated) on its outer face. Since the body 21 has an infinite number of small dents on the surface, when the lure 11 is cast, the lure 11 is less affected by air resistance. This can provide the lure 11 that can be shot further.

Preferably, the body 21 itself is a member that can float on water (including fresh water and sea water).

A specific gravity of the body 21 is less than 1, preferably 0.9 or less, more preferably 0.8 or less, particularly preferably 0.6 or less, for example.

The body 21 is made of a non-magnetic material.

In this specification, the non-magnetic material itself is not magnetized, and does not become magnetized even when a magnet approaches. In other words, the non-magnetic material refers to a material which does not stick to the magnet. The magnetic material refers to a material having a property which becomes magnetized when a magnet approaches (That is, a material which sticks to the magnet). The magnet refers to a member having a magnetic field without receiving a magnetic field or current from the outside (a member having a property which attracts a magnetic material). The magnetic material does not include the magnet.

The non-magnetic material is not particularly limited, and may be a rigid synthetic resin, a soft synthetic resin, a foaming synthetic resin, wood, a substantial non-magnetized metal, an alloy containing such metal, a compound containing such metal, and a composite material containing two or more of these materials. Examples of the substantial non-magnetized metal include lead and tungsten.

The magnetic material is not particularly limited, and may be an iron group metal such as iron, nickel, and cobalt; an alloy containing iron group metal; an iron group metal oxide; and a metal or an alloy containing a mixture of non-magnetic metal and conductive material such as an iron group metal. An example of the mixture of non-magnetic metal and conductive material such as the iron group metal is the alloy containing a mixture of non-magnetic metal such as tungsten and iron.

The magnet is not particularly limited, and may be a ferrite magnet, an alnico magnet, a magnet steel, a resin magnet, and a rubber magnet, for example.

The formation material for the body 21 is not particularly limited, and may be a rigid synthetic resin such as an ABS resin; a soft synthetic resin such as a urethane; a foamed synthetic resin such as a urethane foam; wood; and a combination of two or more materials, for example. These formation materials are the non-magnetic material as mentioned above.

The body 21 may be formed of a formation material having a specific gravity of more than 1 or may be formed of a formation material having a specific gravity of less than 1.

The body 21 may be hollow or solid. The solid body 21 is the body 21 having no space therein.

Preferably, as illustrated in FIG. 3 to FIG. 5, the body 21 has a hollow portion 211 therein (that is, the body 21 is hollow). Due to the presence of the hollow portion 211 in the body 21, even when a formation material having a specific gravity of more than 1 (for example, an ABS resin) is used, the body 21 having a specific gravity of less than 1 can be produced. The hollow body 21 may be formed of a rigid synthetic resin such as an ABS resin, for example.

The body 21 further has the passage 31. The passage 31 is a space in which the spherical sinkers 41 move. The passage 31 extends in the fore and back direction of the body 21. Preferably, the passage 31 linearly extends in the fore and back direction of the body 21.

The passage 31 is formed of a cavity enclosed with a plurality of faces including a lower face 31U formed inside the body 21. Like the body 21, these faces are made of a non-magnetic material. For example, the number of faces constituting the passage 31 is not particularly limited, and may be 3 to 8, preferably 4 to 6.

Specifically, the passage 31 is formed of the lower face 31U that extends in the fore and back direction of the body 21, an upper face 31T that is formed opposite to the lower face 31U and extends in the fore and back direction of the body 21, a left face 31L that is formed between the lower face 31U and the upper face 31T and extends in the fore and back direction of the body 21, and a right face 31R that is formed opposite to the left face 31L and extends in the fore and back direction of the body 21. The passage 31 is formed of the four faces 31U, 31T, 31L, and 31R. That is, the passage 31 as the illustrated example is a space enclosed with the four faces.

For example, the lower face 31U and the upper face 31T are flat faces. The left face 31L and the right face 31R are top faces of an inwardly-protruding long protrusion 311. The top faces of the long protrusion each are an arcuate face including a flat section. The long protrusion is also generally referred to as a rail. Although not illustrated, at least one of the lower face 31U and the upper face 31T may be formed of the top face of the long protrusion. Alternatively, at least one of the left face 31L and the right face 31R may be formed of a flat face.

The spherical sinkers 41 housed in the passage 31 roll on mainly the lower face 31U, and is movable in the fore and back direction of the passage 31.

The faces are generally molded integrally with the body 21. That is, the faces and the body 21 are made of the same material. However, the faces may be molded independently from the body 21, and be bonded to the inside of the body 21 to form the passage 31.

Figure 11:
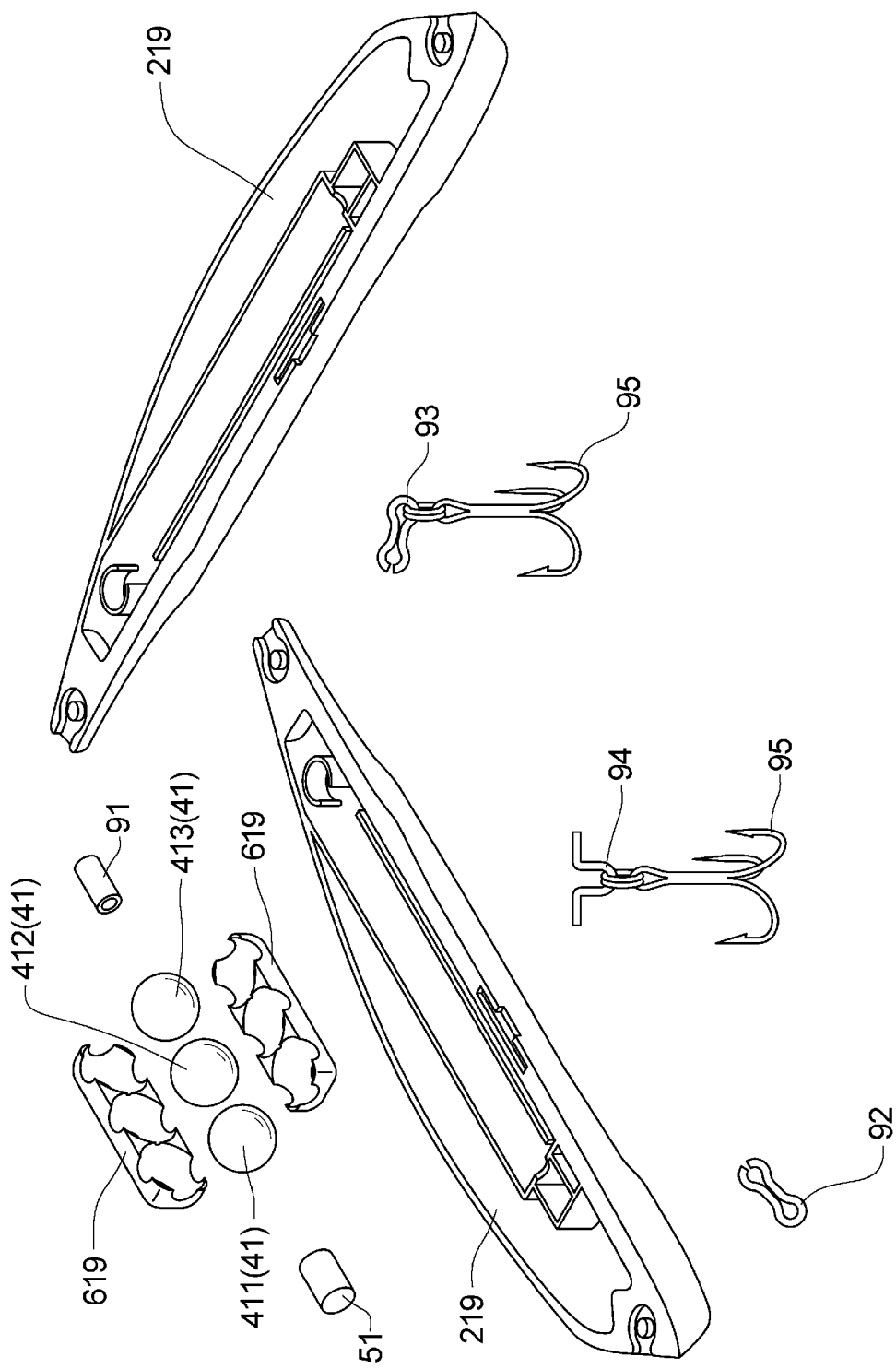
FIG. 11 is an exploded perspective view of the lure.

Generally, the body 21 is produced by bonding a plurality of molded pieces to each other. For example, as illustrated in FIG. 11, the body 21 is formed by bonding a pair of bilateral-symmetric half molded pieces 219, 219 to each other. Advantageously, the cavity 211 and the passage 31 can be easily formed in the body 21 formed by bonding the pair of half molded pieces 219, 219.

A cushion portion 91 is provided in a back portion of the passage 31. The cushion portion 91 mitigates a hitting impact of the spherical sinkers 41, which is caused when the spherical sinkers 41 move to the back side of the passage 31. Such cushion portion 91 can prevent the spherical sinkers 41 from directly hitting against the body 21 to mitigate impact sound as well as prevent damage of the body 21.

The cushion portion 91 is fixed to the back portion of the passage 31. The cushion portion 91 may be formed of a tubular rubber member, for example.

An annular line connection portion 92 for fastening the line protrudes outward from the front side of the body 21. An annular fish hook connection portion 93 for engaging with a fish hook 95 protrudes outward from a back side of the body 21. A similar annular fish hook connection portion 94 protrudes outward from the lower side of the body 21. The hook-shaped fish hook 95 (for example, a treble hook) engages with each of the fish hook connection portions 93, 94.

A publicly known stream resistive plate not illustrated, may be provided on the lower side of the front portion of the body 21. Further, a member swinging like a fin not illustrated may be provided on the outer side of the body 21.

<Attachment Portion>

The attachment portion 51 may be provided in a portion of the passage 31, preferably in the front side of the passage 31. Specifically, the attachment portion 51 is provided on the fore end of the passage 31 as illustrated.

The attachment portion 51 attracts the spherical sinkers 41, and holds the plurality of spherical sinkers 41 in the front side of the passage 31.

In this embodiment in which the spherical sinkers 41 are made of the magnetic material, the attachment portion 51 is formed of a magnet (permanent magnet). The attachment portion 51 may be formed of a resin magnet or a rubber magnet. The resin magnet can be made by molding a resin containing a metal or the like, and the rubber magnet can be made by molding rubber containing a metal or the like. The attachment portion 51 formed of the rubber magnet can mitigate impact and impact sound at hitting of the spherical sinkers 41 against the attachment portion 51.

The shape of the attachment portion 51 is not particularly limited, and may be a columnar shape such as a cylindrical shape as illustrated, and a plate-like shape having a predetermined thickness which is not illustrated.

As illustrated in FIG. 3 and FIG. 5, a case 212 for housing the attachment portion 51 is provided in the front portion of the passage 31 in the body 21. The attachment portion 51 is fitted into the case 212 to be fixed to the body 21.

The case 212 has an opening 213 for exposing a portion of the attachment portion 51. A portion of the attachment portion 51 fitted in the case 212 is exposed to the passage 31 through the opening 213.

<Holding Member and Spherical Sinker>

As illustrated in FIG. 6 to FIG. 10, each of the spherical sinkers 41 is substantially spherical. In this specification, the shape of the spherical sinkers 41 includes complete sphere and barrel-like elliptical sphere capable of rolling in the fore and back direction. The spherical sinkers 41 in the illustrated example are completely spherical.

The spherical sinkers 41 are made of the magnetic material, preferably the magnetic material having a high specific gravity. The specific gravity of the spherical sinkers 41 is not particularly limited as long as it is sufficiently higher than the specific gravity of the body 21, and may be preferably 6 or more, more preferably 7 or more.

The magnetic material for the spherical sinkers 41 is described above. In particular, an iron group metal, an alloy containing an iron group metal, and a metal or an alloy containing a mixture of non-magnetic metal and a conducting material such as an iron group metal (for example, an alloy of lead or tungsten and iron) generally have a specific gravity of 6 or more, and display ferromagnetism, and therefore, are suitable for the materials for the spherical sinkers 41. For example, the spherical sinkers 41 are steel spheres.

The diameter of the spherical sinkers 41 is not particularly limited, and is appropriately set according to the size of the body 21. The diameter of the spherical sinkers 41 is about 2 mm to 15 mm, preferably about 3 mm to 10 mm, for example.

The number of the spherical sinkers 41 housed in the passage 31 is not particularly limited as long as it is plural (two or more), and may be, for example, 2 to 6, preferably 2 to 5, more preferably 2 to 4.

In the illustrated example, three spherical sinkers 41 are housed. The plurality of spherical sinkers 41 may be made of the same material or different materials which are independent of each other. The plurality of spherical sinkers 41 may have the same shape and size, or have different spheres having different diameters. Preferably, the spherical sinker 411 located foremost and the spherical sinker 413 located backmost have the same shape and size, and more preferably, as in the illustrated example, all of the spherical sinkers 41 have the same shape and size.

The spherical sinkers 41 are housed in the passage 31 while being held by the holding member 61. The spherical sinkers 41 are aligned in the fore and back direction of the passage 31, and are housed in the passage 31. The plurality of spherical sinkers 41 is movable in the passage 31 in the fore and back direction while being held in the holding member 61. That is, the united sinker 71 is housed in the passage 31 and is movable in the passage 31 in the fore and back direction.

The holding member 61 holds the plurality of independent spherical sinkers 41 together.

The holding member 61 may be made of the magnetic material or the non-magnetic material. The magnetic material for the holding member 61 may be the same material for the spherical sinkers as described above. Preferably, the holding member 61 is made of the non-magnetic material. Examples of the non-magnetic material for the holding member 61 include a synthetic resin, a foaming resin, a substantially non-magnetic metal, and a composite material as described above. For example, when the holding member 61 is made of a substantially non-magnetic metal (for example, lead and tungsten), the weight of the united sinker (the spherical sinkers 41 and the holding member 61) suitably becomes large.

A synthetic resin can be readily molded. Thus, using a rigid synthetic resin as the non-magnetic material, the holding member 61 can be readily produced. Other than the ABS resin described above, examples of the rigid synthetic resin include an olefin resin such as polypropylene, a polyester resin, a polyvinyl chloride resin, a polycarbonate resin, and a polystyrene resin.

The holding member 61 holds the plurality of spherical sinkers 41 such that the spherical sinker 411 located foremost and the spherical sinker 413 located backmost can each independently come into point-contact with the lower face 31U of the passage 31 and rotate.

In the illustrated example, the holding member 61 holds the plurality of spherical sinkers 41 such that all of the spherical sinkers 41 can each independently come into point-contact with the lower face 31U of the passage 31 and rotate.

Here, the spherical sinker 411 located foremost refers to the spherical sinker 41 located foremost in the state where the plurality of spherical sinkers 41 is housed in the passage 31, and the spherical sinker 413 located backmost refers to the spherical sinker 41 located backmost in the state where the plurality of spherical sinkers 41 is housed in the passage 31. As illustrated in FIG. 3, in the case where three spherical sinkers 41 are housed in the passage 31, the left spherical sinker 41 in the figure is the spherical sinker 411 located foremost, the right spherical sinker 41 in the figure is the spherical sinker 413 located backmost, and the middle spherical sinker 41 is the spherical sinker 412 located intermediately.

Although not illustrated, in the case where the four or more spherical sinkers 41 are housed in the passage 31, two or more intermediate spherical sinkers are present. When the two spherical sinkers 41 are housed in the passage 31, the spherical sinker located intermediately is absent, and only the spherical sinker located foremost and the spherical sinker located backmost are present.

Hereinafter, the spherical sinker 411 located foremost may be also referred to as a "foremost spherical sinker", the spherical sinker 413 located backmost may be also referred to as a "backmost spherical sinker", and the spherical sinker 412 located intermediately may be also referred to as an "intermediate spherical sinker".

Specifically, the holding member 61 holds the foremost spherical sinker 411 with a fore end 411F, a lower end 411U, an upper end 411T, a left end 411L, and a right end 411R of the foremost spherical sinker 411 being exposed. The holding member 61 holds the backmost spherical sinker 413 with a back end 413B, a lower end 413U, an upper end 413T, a left end 413L, and a right end 413R of the backmost spherical sinker 413 being exposed. Further, the holding member 61 holds the intermediate spherical sinker 412 with a lower end 412U, an upper end 412T, a left end 412L, and a right end 412R of the intermediate spherical sinker 412 being exposed.

In other words, the fore end 411F, the lower end 411U, the upper end 411T, the left end 411L, and the right end 411R of the foremost spherical sinker 411 are located outer than a fore outer face 61F, a lower outer face 61U, an upper outer face 61T, a left outer face 61L, and a right outer face 61R of the holding member 61, respectively. The back end 413B, the lower end 413U, the upper end 413T, the left end 413L, and the right end 413R of the backmost spherical sinker 413 are located outer than a back outer face 61B, the lower outer face 61U, the upper outer face 61T, the left outer face 61L, and the right outer face 61R of the holding member 61, respectively. The lower end 412U, the upper end 412T, the left end 412L, and the right end 412R of the intermediate spherical sinker 412 are located outer than the lower outer face 61U, the upper outer face 61T, the left outer face 61L, and the right outer face 61R of the holding member 61, respectively. Accordingly, the lower end, the upper end, the left end, and the right end of all spherical sinkers 41 are located outer than the lower outer face 61U, the upper outer face 61T, the left outer face 61L, and the right outer face 61R of the holding member 61.

The fore end, the back end, the lower end, the upper end, the left end, and the right end of each spherical sinker 41 are intersection points of three straight lines (X axis, Y axis, Z axis) that are orthogonal to the surface of the spherical sinker 41. Conceptually, the three straight lines (X axis, Y axis, Z axis) pass the center of the sphere and are orthogonal to one another at the center.

The holding member 61 has substantial cubic lattices each having a cavity for rotatably housing the respective spherical sinker 41, and the same number of cubic lattices as the spherical sinkers 41 are arranged in a line in the holding member. The cavity is a space surrounded with an inner face 611 of the cubic lattice. The spherical sinker 41 is housed in the cavity with a slight gap from the inner face 611. As in the illustrated example, the holding member 61 may be constituted of two (plural) components, or may be constituted of one component.

The lengths of each cubic lattice in the left and right direction and in the upper and lower direction each are smaller than the diameter of the spherical sinker 41. The length of the cubic lattice that houses the intermediate spherical sinker 412 in the fore and back direction is slightly larger than the diameter of the spherical sinker 41. The foremost spherical sinker 411, the intermediate spherical sinker 412, and the backmost spherical sinker 413 are spaced at a small interval, and are housed in the respective cubic lattices of the holding member 61. That is, the holding member 61 holds the spherical sinkers 41 such that the adjacent spherical sinkers 41 are arranged with a gap therebetween to separate from each other.

Accordingly, the spherical sinkers 41 held by the holding member 61 can each independently rotate in the holding member 61.

The united sinker 71 is housed in the passage 31 to constitute the lure 11.

Since the lower ends of the spherical sinkers 41 are exposed from the holding member 61, the lower end of the united sinker 71 in the passage 31 come into point-contact with the lower face 31U of the passage 31. In the united sinker 71, the lower ends of the spherical sinkers 41 can rotate while being in contact with the lower face 31U of the passage 31, and move in the fore and back direction of the passage 31. In this embodiment, the lower end 411U of the foremost spherical sinker 411, the lower end 412U of the intermediate spherical sinker 412, and the lower end 413U of the backmost spherical sinker 413 come into point-contact with the lower face 31U of the passage 31, and the spherical sinkers 411, 412, and 413 can roll while rotating along the lower face 31U.

Since the upper ends of the spherical sinkers 41 are exposed from the holding member 61, the upper end of the united sinker 71 in the passage 31 come into point-contact with the upper face 31T of the passage 31. Accordingly, in the united sinker 71, the upper ends of the spherical sinkers 41 can rotate while being in contact with the upper face 31T of the passage 31, and move in the fore and back direction of the passage 31. In this embodiment, the upper end 411T of the foremost spherical sinker 411, the upper end 412T of the intermediate spherical sinker 412, and the upper end 413T of the backmost spherical sinker 413 come into point-contact with the upper face 31T of the passage 31, and the spherical sinkers 411, 412, and 413 can roll while rotating along the upper face 31T.

Since the left ends and the right ends of the spherical sinkers 41 are exposed from the holding member 61, the left end and the right end of the united sinker 71 in the passage 31 come into point-contact with the left face 31L and the right face 31R of the passage 31, respectively. Accordingly, in the united sinker 71, the left ends and/or right ends of the spherical sinkers 41 can rotate while being in contact with the left face 31L and/or the right face 31R of the passage 31, and move in the fore and back direction of the passage 31. In this embodiment, the left end 411L of the foremost spherical sinker 411, the left end 412L of the intermediate spherical sinker 412, and the left end 413L of the backmost spherical sinker 413 come into point-contact with the left face 31L of the passage 31, and the spherical sinkers 411, 412, and 413 can roll while rotating along the left face 31L. The right end 411R of the foremost spherical sinker 411, the right end 412R of the intermediate spherical sinker 412, and the right end 413R of the backmost spherical sinker 413 come into point-contact with the right face 31R of the passage 31, and the spherical sinkers 411, 412, and 413 can roll while rotating along the right face 31R.

Since the fore end 411F of the foremost spherical sinker 411 is exposed from the holding member 61, the fore end 411F of the united sinker 71 in the passage 31 is attached to the attachment portion 51. Further, since the back end 413B of the backmost spherical sinker 413 is exposed from the holding member 61, the back end 413B of the united sinker 71 in the passage 31 comes into contact with the cushion portion 91.

FIG. 11 is an exploded perspective view of the lure 11 of the present invention.

In FIG. 11, a reference numeral 219 denotes a pair of half molded pieces that constitutes the body 21, a reference numeral 619 denotes a pair of half molded pieces that constitutes the holding member 61.

The pair of half molded pieces 619 can be bonded to each other by means of an adhesive or the like so as to place the plurality of spherical sinkers 41 therebetween to acquire the united sinker 71 as illustrated in FIG. 6 to FIG. 10.

The pair of half molded pieces 219 can be bonded to each other so as to place the united sinker 71, the cushion portion 91, the line connection portion 92, and the fish hook connection portion 93 therebetween to acquire the lure 11 as illustrated in FIG. 1 to FIG. 5.

<Usage of Lure>

Figure 12:
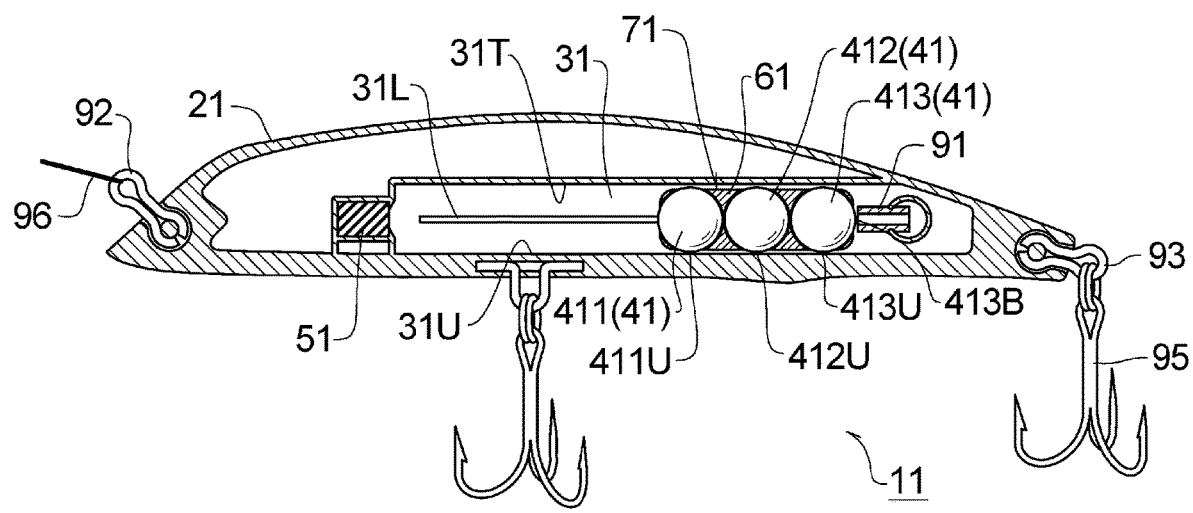
FIG. 12 is a lateral sectional view illustrating the used state of the lure when spherical sinkers (united sinker) move to the back side of the passage.

During use of the lure 11, a line 96 is connected to the line connection portion 92. When the lure 11 is cast, the spherical sinkers 41 move to the back side of the passage 31 due to inertia. In the lure 11 of the present invention, since the plurality of spherical sinkers 41 is held by the holding member 61 together, all of the spherical sinkers 41 (united sinker 71) are detached from the attachment portion 51, and reliably move to the back side (See FIG. 12). In the united sinker 71 that moves to the back side, the back end 413B of the backmost spherical sinker 413 comes into contact with the cushion portion 91.

Since all of the spherical sinkers 41 together move to the back side of the passage 31, the lure 11 can stably fly and be cast further with the back portion of the lure 11 being oriented to the front. Further, the lure, in which the spherical sinkers 41 together are held in the back portion of the passage 31, lands water in a suitable position.

Figure 13:
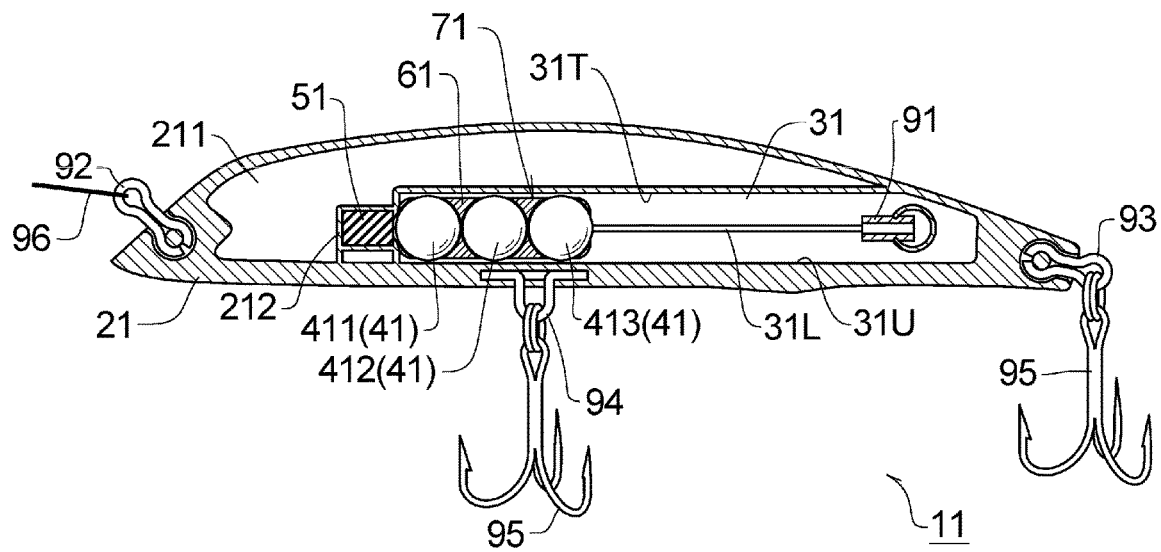
FIG. 13 is a lateral sectional view illustrating the used state of the lure when spherical sinkers (united sinker) move to the front side of the passage.

When the lure 11 enters into water, each spherical sinker 41 moves to the front portion of the body 21. Since the plurality of spherical sinkers 41 is held together in the holding member 61, all of the spherical sinkers 41 (united sinker 71) are detached from the cushion portion 91, and reliably move to the front side. The foremost spherical sinker 411 in the moved united sinker 71 is attached to the attachment portion 51 and held there (See FIG. 13) by the magnetic force.

All of the spherical sinkers 41 are held by the attachment portion 51, thereby moving the center of gravity of the lure 11 to the front side. When the lure 11 is pulled in this state, the lure 11 swims with the back portion laterally swinging.

After landing of the lure on water, a fisherman generally operates a fishing rod to cause the lure to irregularly move. For the lure including the spherical sinkers independently housed in the passage as described in Patent Document 1, when the lure irregularly moves as described above, the back spherical sinker can be detached.

In this connection, in the lure 11 of the present invention, the spherical sinkers 41 are held by the holding member 61, and integrally move without independently moving. Thus, all of the spherical sinkers are held in the back side of the passage 31 at long casting, and are held in the front side of the passage 31 during swimming, while preventing the spherical sinkers from independently moving to the back or front side.

Since each spherical sinker 41 rotates with the lower end 411U, 412U, and 413U of each spherical sinker 41 held in the holding member 61 being in contact with the lower face 31U of the passage 31, the united sinker 71 smoothly moves in the passage 31. Further, since the contact area of the spherical sinker 41 and the lower face 31U of the passage 31 is extremely small (the spherical sinker 41 rotates with the lower ends 411U, 412U, and 413U of each spherical sinker 41 being in point-contact with the lower face 31U), a large sound never occurs during movement of the united sinker 71.

For the lure in which a long side of a holding plate is inserted into a lower groove of a passage to move the holding plate as described in Patent Document 2, a resistance caused between the holding plate and both walls constituting the lower groove is large to hamper smooth movement, thereby causing a large sound.

According to the present invention, since the spherical sinkers 41 rotate while being in point-contact with the lower face 31U of the passage 31, a resistance during movement of the united sinker 71 is small.

Unlike the lure described in Patent Document 2, the lure 11 of the present invention need not have a lower groove nor upper groove in the passage. Therefore, even the lure 11 having the relatively small body 21 can achieve the above-mentioned effects.

Additionally, the lure 11 of the present invention is hard to deviate in the left and right direction during movement of the spherical sinkers 41, and can stably travel.

Figure 14:
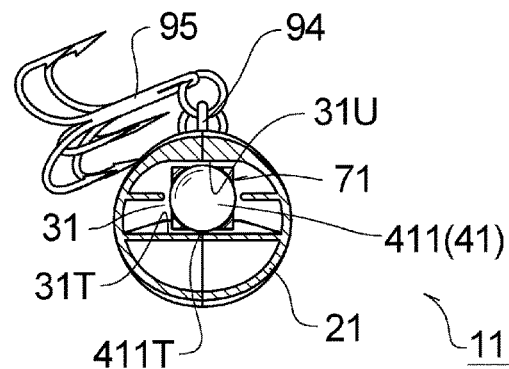
FIG. 14 is a vertical sectional view of the used state of the lure when the upper side of the lure is oriented to the earth.

As in this embodiment, when at least the upper end 411T of the foremost spherical sinker 411 and the upper end 413T of the backmost spherical sinker 413 are exposed from the holding member 61, the spherical sinkers 41 can rotate while being in contact with the upper face 31T of the passage 31. For this reason, as illustrated in FIG. 14, when the lure 11 is cast or the lure 11 lands water, even in the case where the upper side of the lure 11 is oriented to the earth, at least the upper end 411T of the foremost spherical sinker 411 and the upper end 413T of the backmost spherical sinker 413 rotate while being in contact with the upper face 31T of the passage 31. Accordingly, even in the case where the upper side of the lure 11 is oriented to the earth, the united sinker 71 smoothly moves in the passage 31.

Figure 15:
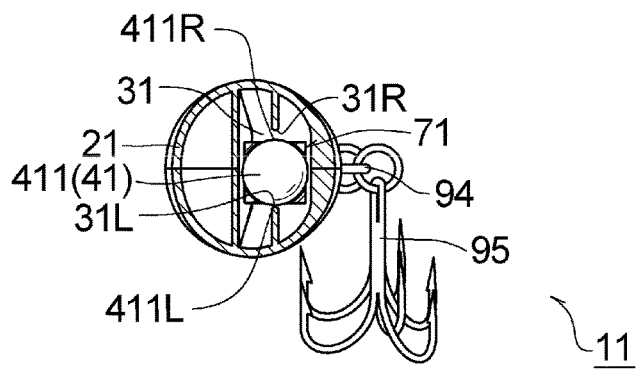
FIG. 15 is a vertical sectional view of the used state of the lure when the left side of the lure is oriented to the earth.

Further, as in this embodiment, when at least the left end 411L and the right end 411R of the foremost spherical sinker 411 and the left end 413L and the right end 413R of the backmost spherical sinker 413 are exposed from the holding member 61, the spherical sinkers 41 can rotate while being in contact with the left face 31L and the right face 31R of the passage 31. For this reason, as illustrated in FIG. 15, when the lure 11 is cast or the lure 11 lands water, even in the case where the left side of the lure 11 is oriented to the earth, at least the left end 411L of the foremost spherical sinker 411 and the left end 413L of the backmost spherical sinker 413 rotate while being in contact with the left face 31L of the passage 31. Accordingly, even in the case where the left side of the lure 11 is oriented to the earth, the united sinker 71 smoothly moves in the passage 31. Similarly, even in the case where the right side of the lure 11 is oriented to the earth (not illustrated), the united sinker 71 smoothly moves in the passage 31.

The configuration of the lure of the present invention is not limited to the configuration described in First embodiment, and may be variously modified. Hereinafter, differences in configuration between First embodiment and other embodiments will be mainly described, description of similarities is omitted, and the terms in First embodiment may be cited in the other embodiments.

Second Embodiment

Figure 16:
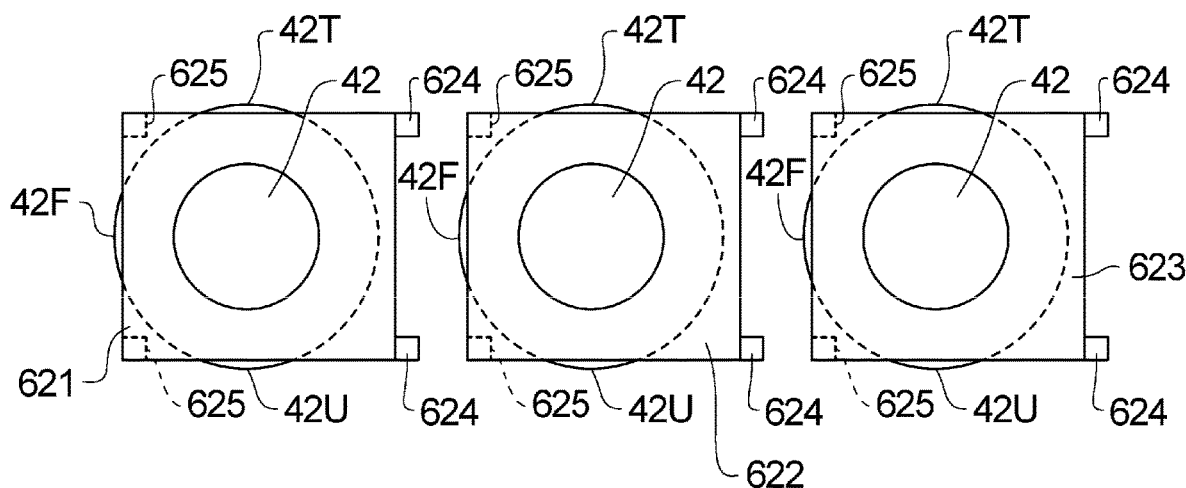
FIG. 16 is a side view of a divided-type of a holding member in Second embodiment in the divided state.
Figure 17:
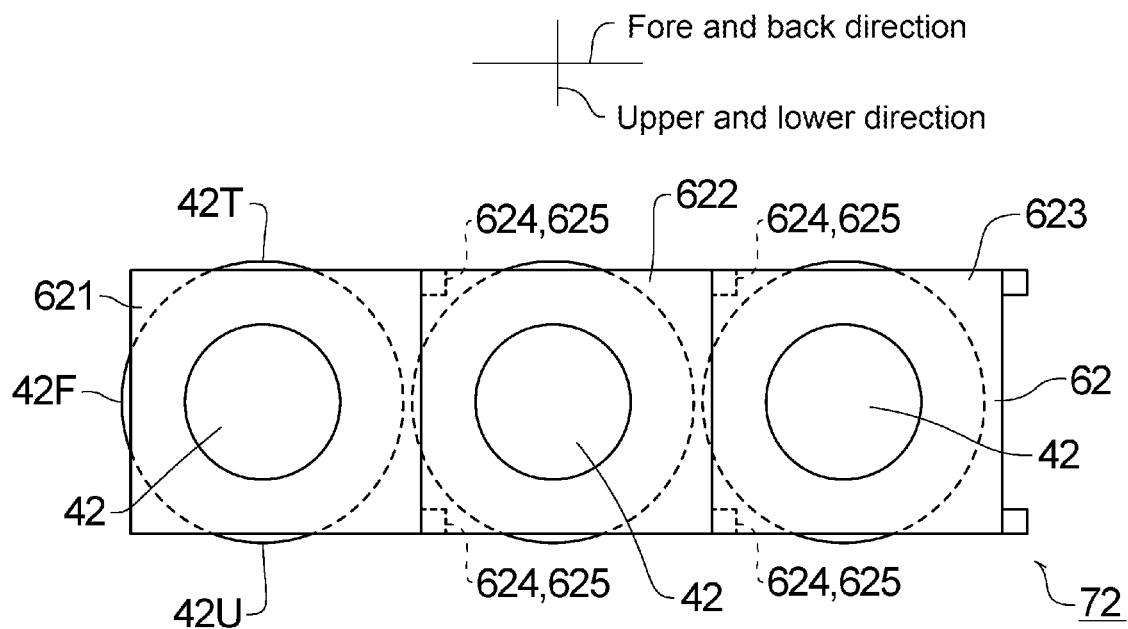
FIG. 17 is a side view of a holding member and a plurality of spherical sinkers (united sinker) held by the holding member in Second embodiment.
Figure 18:
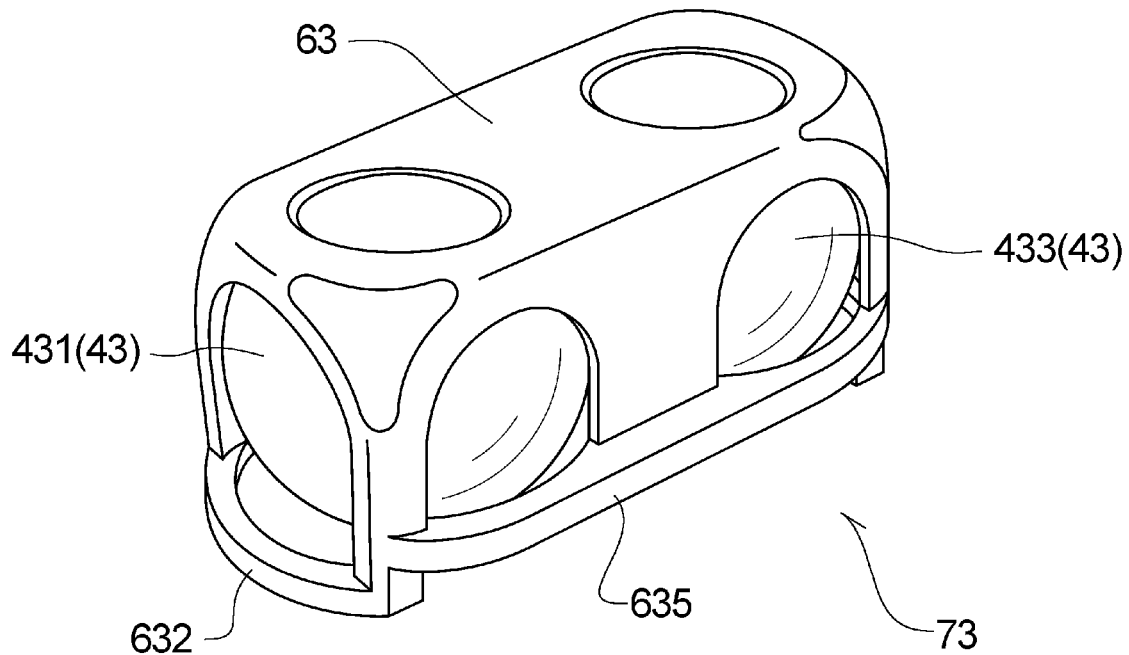
FIG. 18 is a perspective view of a holding member and a plurality of spherical sinkers (united sinker) held by the holding member in Third embodiment.

As illustrated in FIG. 16 and FIG. 17, a holding member 62 may be divided into plural units in the fore and back direction.

Specifically, as illustrated in FIG. 16, the holding member 62 is configured of a plurality of (three in the illustrated example) divided units 621, 622, 623 that is coupled to each other in the fore and back direction. The divided units 621, 622, 623 each rotatably hold one spherical sinker 42. The spherical sinkers 42 are held in the divided units 621, 622, 623 with fore ends 42F, upper ends 42T, and lower ends 42U being exposed. Inserting dents 624 are formed on the back portion of each of the divided units 621, 622, 623, and recesses 625 are formed on the front portion of each of the divided units 621, 622, 623.

In the plurality of divided units 621, 622, 623 each holding the spherical sinker 42, the dents 624 are inserted into the respective recesses 625 and fixed to each other with an adhesive or the like, to constitute the holding member 62 that holds the plurality of spherical sinkers 42 together (See FIG. 17).

The holding member 62 in Second embodiment is configured by coupling the divided units 621, 622, 623 each having the spherical sinker 42 to each other. Thus, the number of the held spherical sinkers 42 can be readily set. For example, to form the holding member 62 holding two spherical sinkers 42, two of divided units 621, 622, 623 may be coupled to each other, or to form the holding member 62 holding four spherical sinkers 42, four of divided units 621, 622, 623 may be coupled to each other. In this manner, the number of the spherical sinkers 42 in a united sinker 72 can be readily set.

The divided units 621, 622, 623 may be formed so as to expose the back ends of the spherical sinkers 42 (not illustrated).

In the united sinker 72 (the holding member 62 and the plurality of spherical sinkers 42 held by the holding member 62) in Second embodiment, like the united sinker in First embodiment, the plurality of spherical sinkers 42 is aligned in the fore and back direction, and is housed in the passage.

The lure in Second embodiment achieves the same effects as the lure in First embodiment. For example, the united sinker 72 can smoothly move in the passage.

Third Embodiment

Figure 19:
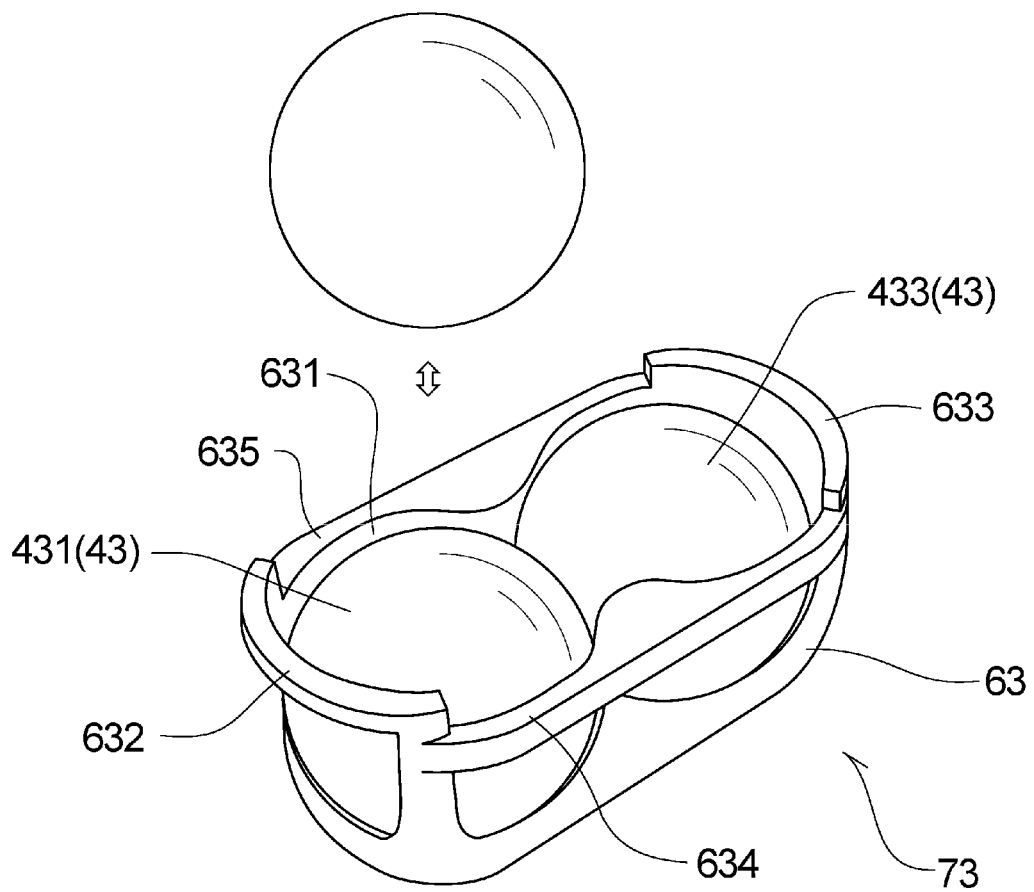
FIG. 19 is a perspective view of the united sinker in Third embodiment when viewed from below.
Figure 20:
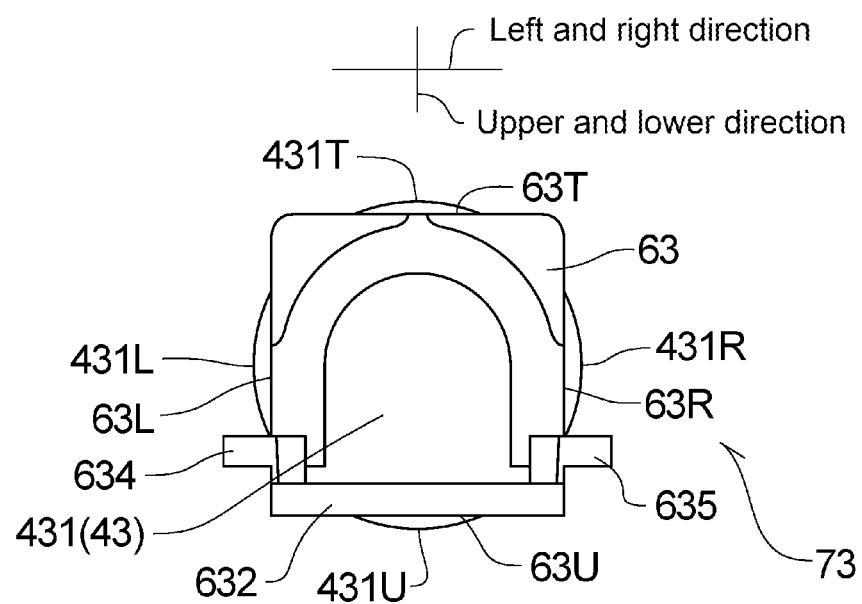
FIG. 20 is a front view of the united sinker in Third embodiment.
Figure 21:
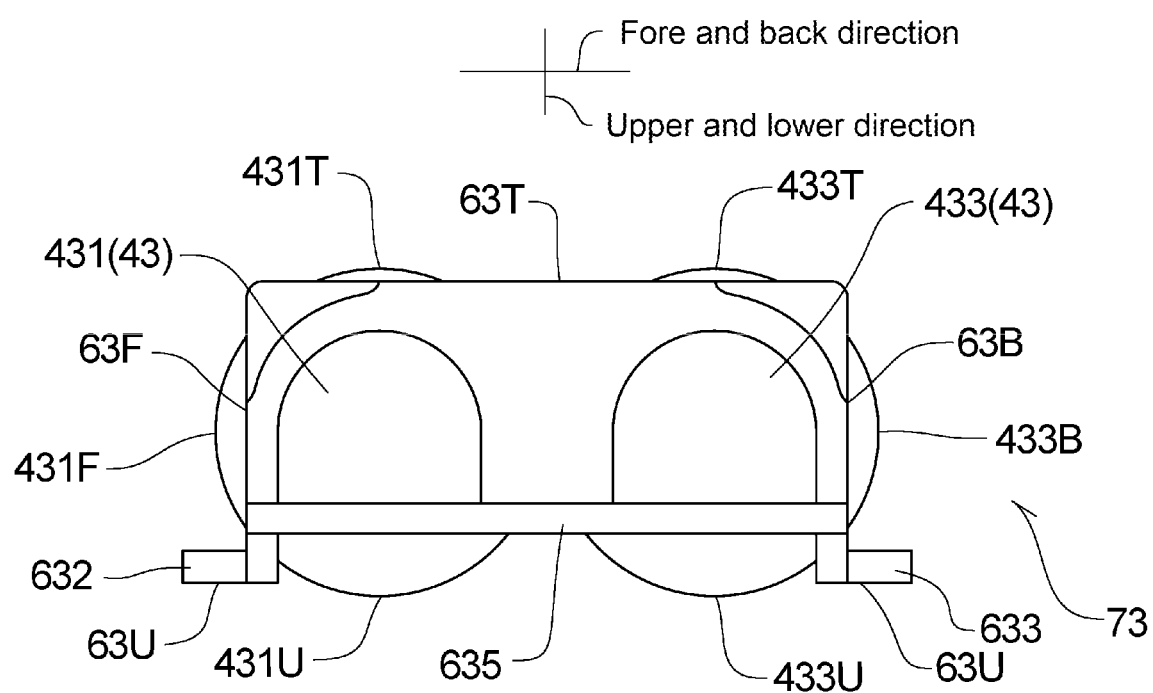
FIG. 21 is a side view of the united sinker in Third embodiment.

As illustrated in FIG. 18 to FIG. 21, a holding member 63 has a frame unit including a cavity that rotatably houses spherical sinkers 43. The holding member 63 can hold a plurality of spherical sinkers 43 (two spherical sinkers 43 in the illustrated example). As illustrated in FIG. 19, an opening 631 that is slightly larger than the diameter of the spherical sinkers 43 is provided on the lower portion of the holding member 63. The spherical sinkers 43 can be taken in and out the holding member 63 from the opening 631. The holding member 63 holds the foremost spherical sinker 431 with the fore end 431F, the lower end 431U, the upper end 431T, the left end 431L, and the right end 431R of the foremost spherical sinker 431 being exposed. The holding member 63 holds the backmost spherical sinker 433 with the back end 433B, the lower end 433U, the upper end 433T, the left end 433L, and the right end 433R of the backmost spherical sinker 433 being exposed. In other words, the fore end 431F, the lower end 431U, the upper end 431T, the left end 431L, and the right end 431R of the foremost spherical sinker 431 are located outer than a fore outer face 63F, a lower outer face 63U, an upper outer face 63T, a left outer face 63L, and a right outer face 63R of the holding member 63, respectively. The back end 433B, the lower end 433U, the upper end 433T, the left end 433L, and the right end 433R of the backmost spherical sinker 433 are located outer than a back outer face 63B, a lower outer face 63U, an upper outer face 63T, a left outer face 63L, and a right outer face 63R of the holding member 63, respectively.

However, to form the opening 631 that is larger than the diameter of the spherical sinkers 43 on the lower portion of the holding member 63, a lower fore frame 632, a lower back frame 633, a lower left frame 634, and a lower right frame 635 of the holding member 63 slightly expand outward in the fore and back and left and right directions.

Figure 22:
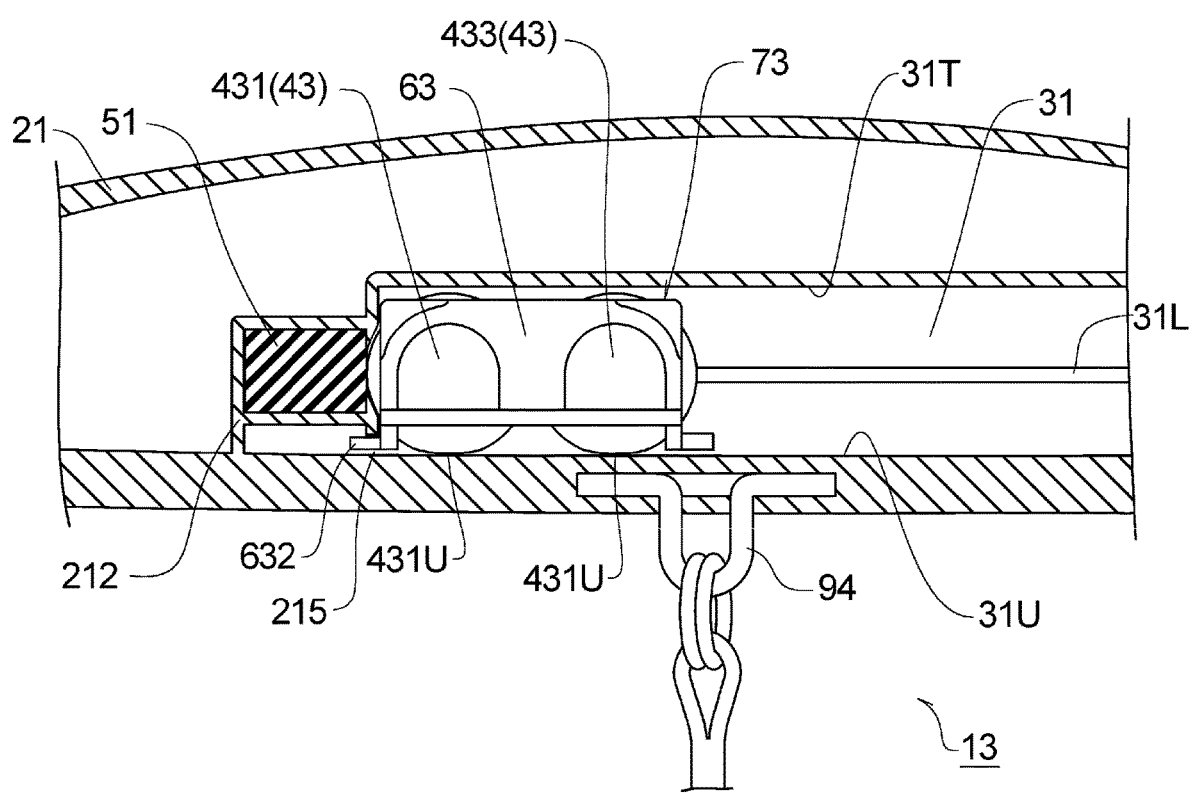
FIG. 22 is an enlarged lateral sectional view of the lure in Third embodiment in which the united sinker is housed in a passage. The holding member is not illustrated in cross section (This also applies to FIG. 23 and FIG. 39).
Figure 23:
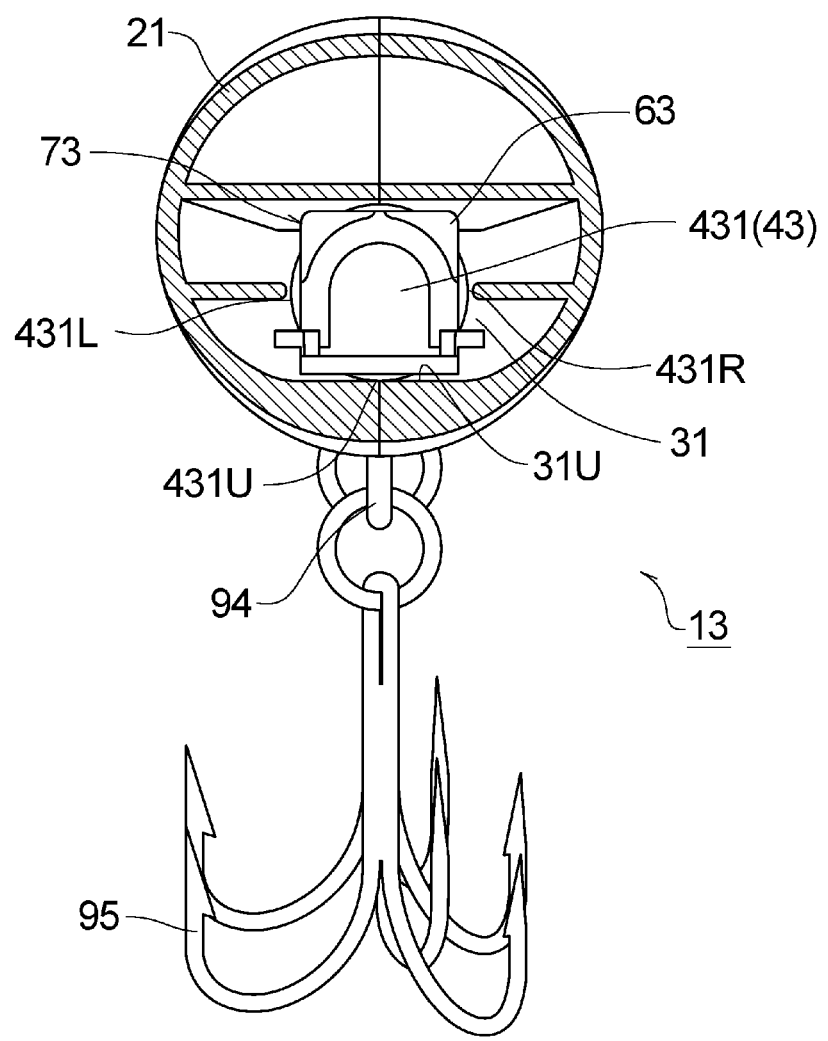
FIG. 23 is an enlarged vertical sectional view of the lure in Third embodiment.

In the united sinker 73 (the holding member 63 and the plurality of spherical sinkers 43 held by the holding member 63) in Third embodiment, like the united sinker in First embodiment, the plurality of spherical sinkers 43 is aligned in the fore and back direction, and is housed in the passage 31. However, the case 212 has an opening 215 that receives the lower fore frame 632 of the holding member 63 such that the lower frame of the holding member 63 does not prevent the united sinker 73 from being attached to the attachment portion 51 (See FIG. 22).

The lure 13 in Third embodiment also achieves the same effects as the lure in First embodiment. For example, the united sinker 73 can smoothly move in the passage 31.

The holding member 63 in Third embodiment can readily take in and out the spherical sinkers 43.

Forth Embodiment

Figure 24:
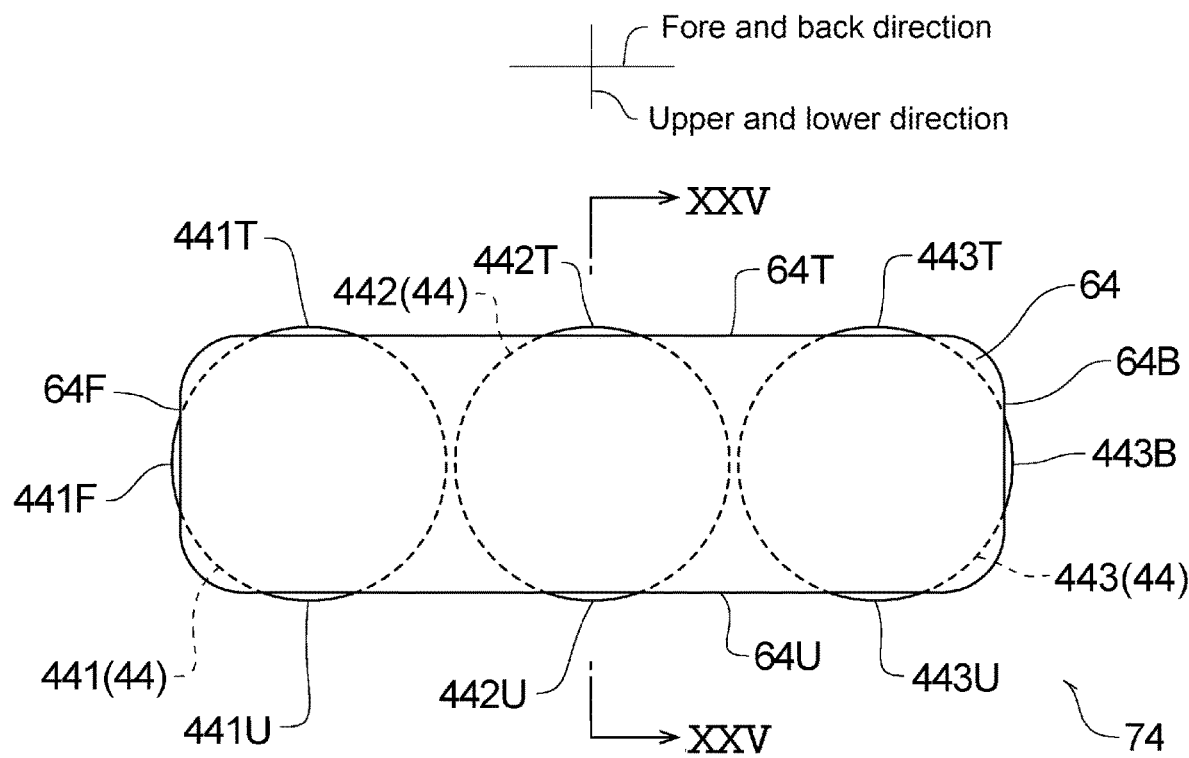
FIG. 24 is a side view illustrating a holding member and a plurality of spherical sinkers held by the holding member in a first example in Forth embodiment.
Figure 25:
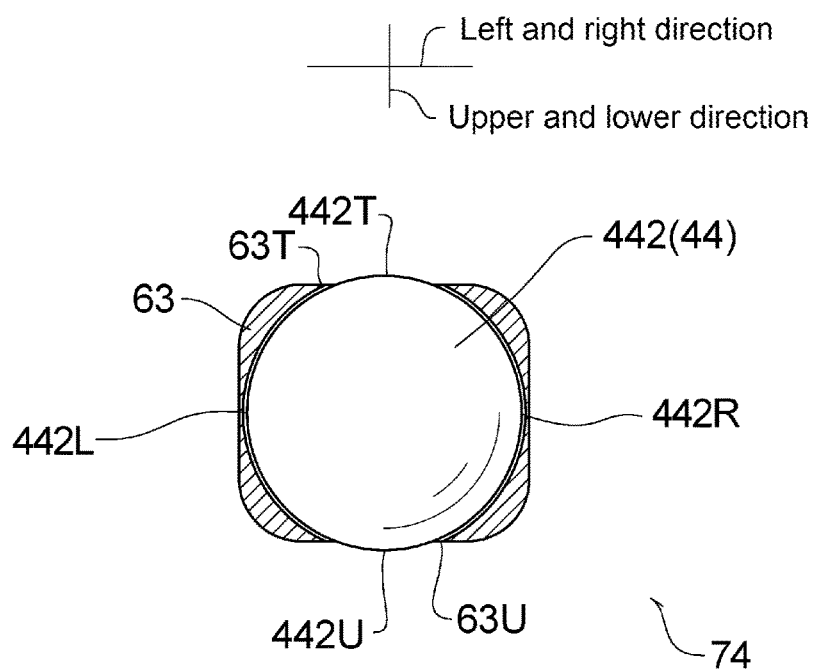
FIG. 25 is a vertical sectional view taken along a line XXV-XXV in FIG. 24.

In the united sinker in each of the above embodiments, the left end and the right end of each spherical sinker is exposed from the holding member. However, for example, as illustrated in FIG. 24 and FIG. 25, in a united sinker 74, a left end 442L and a right end 442R of each spherical sinker 44 may be covered with a left outer face 64L and a right outer face 64R of a holding member 64, respectively. In the illustrated example, a fore end 441F, a lower end 441U, and an upper end 441T of the foremost spherical sinker 441 are exposed from a fore outer face 64F, a lower outer face 64U, and an upper outer face 64T of the holding member 64, respectively, a back end 443B, a lower end 443U, and an upper end 443T of the backmost spherical sinker 443 are exposed from a back outer face 64B, a lower outer face 64U, and an upper outer face 64T of the holding member 64, respectively, and a lower end 442U and an upper end 442T of the intermediate spherical sinker 442 are exposed from the lower outer face 64U and the upper outer face 64T of the holding member 64, respectively.

Figure 26:
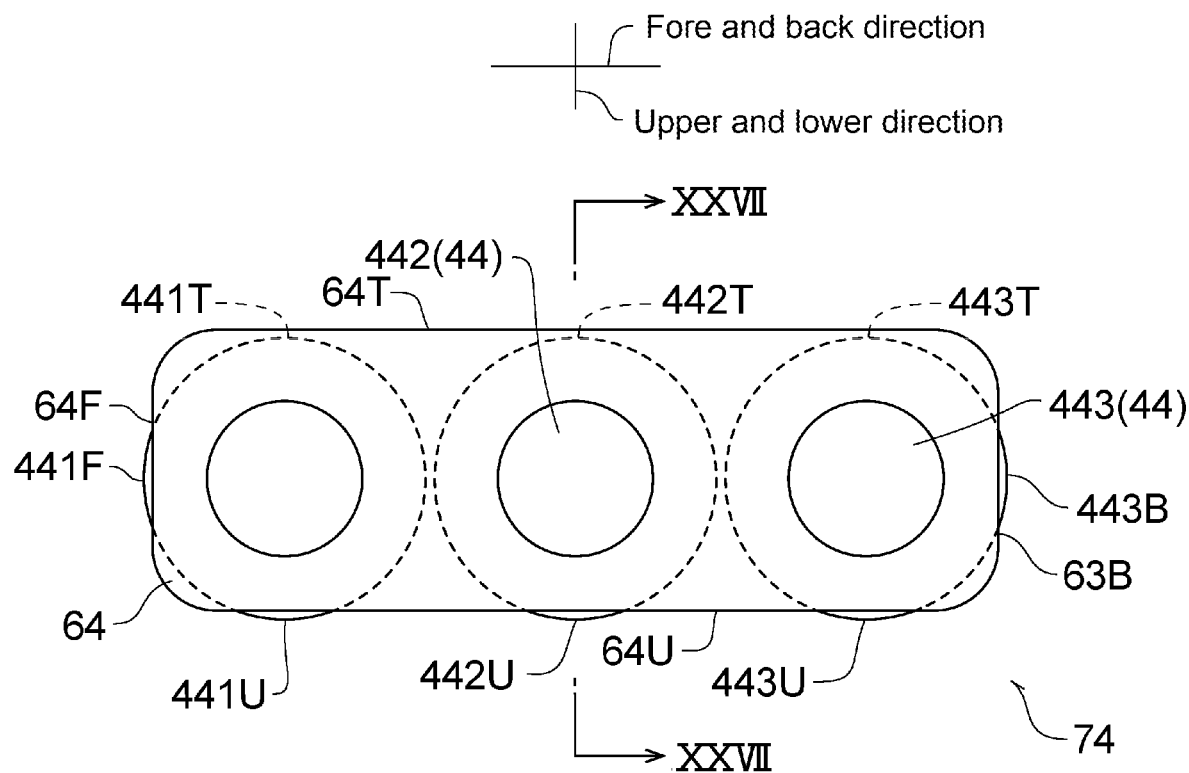
FIG. 26 is a side view illustrating a united sinker in a second example in Forth embodiment.
Figure 27:
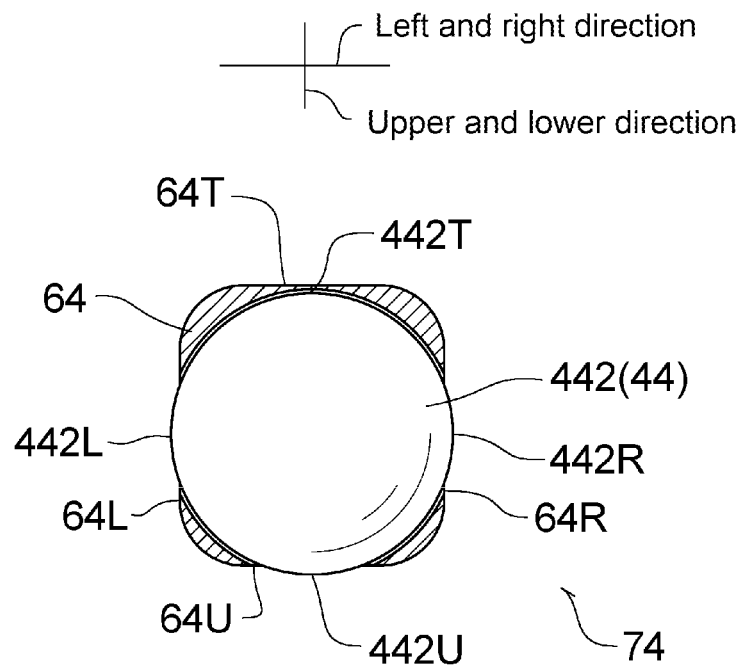
FIG. 27 is a vertical sectional view taken along a line XXVII-XXVII in FIG. 26.

Further, as illustrated in FIG. 26 and FIG. 27, in the united sinker 74, upper ends 441T, 442T, 443T of each spherical sinker 44 may be covered with an upper outer face 64T of a holding member 64. In the illustrated example, a fore end 441F, a lower end 441U, and a left end and a right end of the foremost spherical sinker 441 are exposed from the holding member 64, a back end 443B, a lower end 443U, and a left end, and a right end of the backmost spherical sinker 443 are exposed from the holding member 64, and a lower end 442U, a left end 442L and a right end 442R of the intermediate spherical sinker 442 are exposed from the holding member 64.

Figure 28:
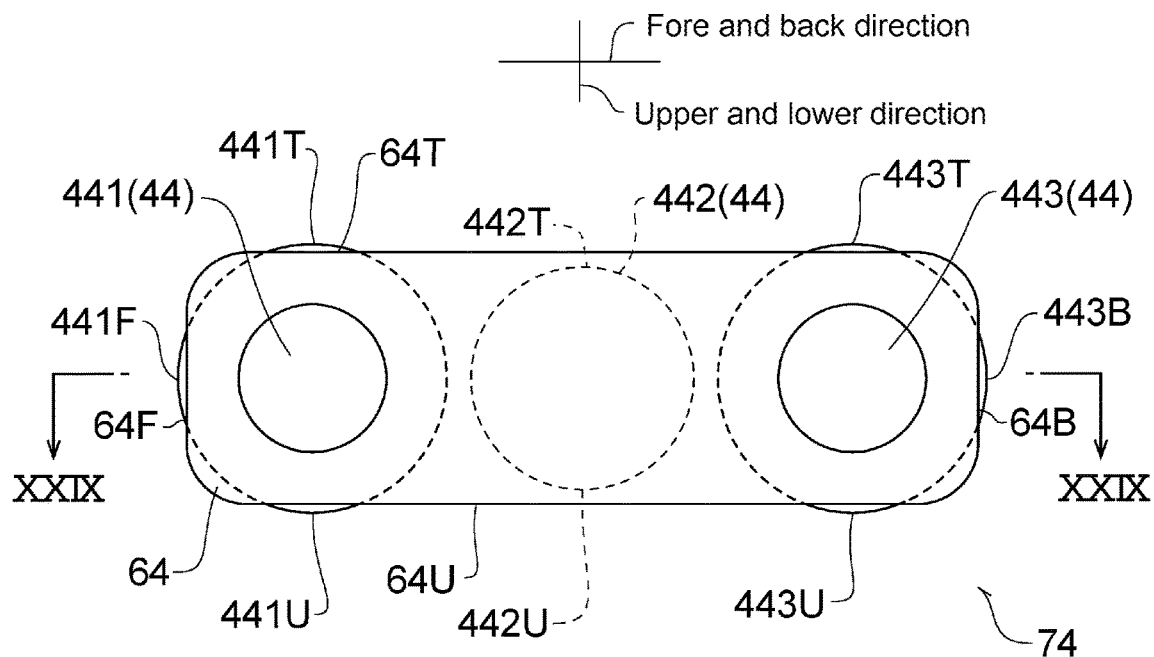
FIG. 28 is a side view illustrating a united sinker in a third example in Forth embodiment.
Figure 29:
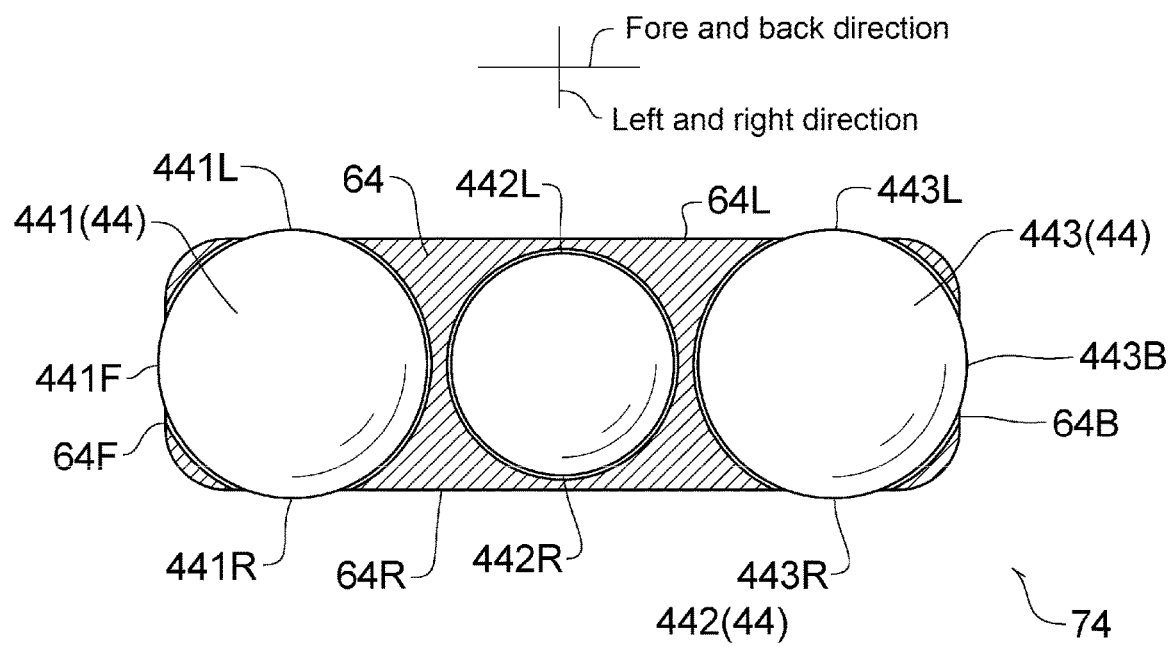
FIG. 29 is a lateral sectional view taken along a line XXIX-XXIX in FIG. 28.

As illustrated in FIG. 28 and FIG. 29, in the united sinker 74, the whole circumstance of the intermediate spherical sinker 442 may be covered with the holding member 64. In the illustrated example, the fore end 441F, the lower end 441U, the upper end 441T, the left end 441L, and the right end 441R of the foremost spherical sinker 441 are located outer than a fore outer face 64F, a lower outer face 64U, an upper outer face 64T, a left outer face 64L, and a right outer face 64R of the holding member 64, respectively. The back end 443B, the lower end 443U, the upper end 443T, the left end 443L, and the right end 443R of the backmost spherical sinker 443 are located outer than a back outer face 64B, the lower outer face 64U, the upper outer face 64T, the left outer face 64L, and the right outer face 64R of the holding member 64, respectively. The lower end 442U, the upper end 442T, the left end 442L, and the right end 442R of the intermediate spherical sinker 442 are located inner than the lower outer face 64U, the upper outer face 64T, the left outer face 64L, and the right outer face 64R of the holding member 64, respectively. Accordingly, the intermediate spherical sinker 442 is covered with the holding member 64, and is not exposed to the outside. In this case, the diameter of the intermediate spherical sinker 442 is slightly smaller than that of the foremost spherical sinker 441 and the backmost spherical sinker 443.

As described above, since the lower end 441U of the foremost spherical sinker 441 and the lower end 443U of the backmost spherical sinker 443 are exposed and are in contact with the lower face 31U of the passage 31, the united sinker 74 suitably moves in the fore and back direction. That is, in the case where such foremost spherical sinker 441 and backmost spherical sinker 443 are provided, the intermediate spherical sinker 442 does not contribute to travelling of the united sinker 74 and thus, may be wholly covered with the holding member 64. Further, in place of the intermediate spherical sinker 442, an unrolling sinker (substantially cubic sinker, distorted sinker, and so forth) may be provided between the foremost spherical sinker 441 and the backmost spherical sinker 443, for example. Such unrolling sinker need not be produced with high accuracy and therefore, can be readily manufactured.

Accordingly, in the lure of the present invention, since at least the lower end of the foremost spherical sinker and the lower end of the backmost spherical sinker are exposed from the holding member, and are in point-contact with the lower face of the passage, the united sinker smoothly moves in the fore and back direction.

Preferably, the lower end of the foremost spherical sinker is exposed from the holding member, at least one end selected from the upper end, the left end, and the right end of the foremost spherical sinker is exposed from the holding member, the lower end of the backmost spherical sinker is exposed from the holding member, and at least one end selected from the upper end, the left end, and the right end of the backmost spherical sinker is exposed from the holding member.

More preferably, the lower end and the upper end of the foremost spherical sinker and the lower end and the upper end of the backmost spherical sinker are exposed from the holding member and further preferably, as in First embodiment, the lower end, the upper end, the left end, and the right end of the foremost spherical sinker and the lower end, the upper end, the left end, and the right end of the backmost spherical sinker are exposed from the holding member. At least one end selected from the lower end, the upper end, the left end, and the right end of the intermediate spherical sinker is exposed from the holding member, or all of the ends are covered with the holding member.

Fifth Embodiment

Figure 30:
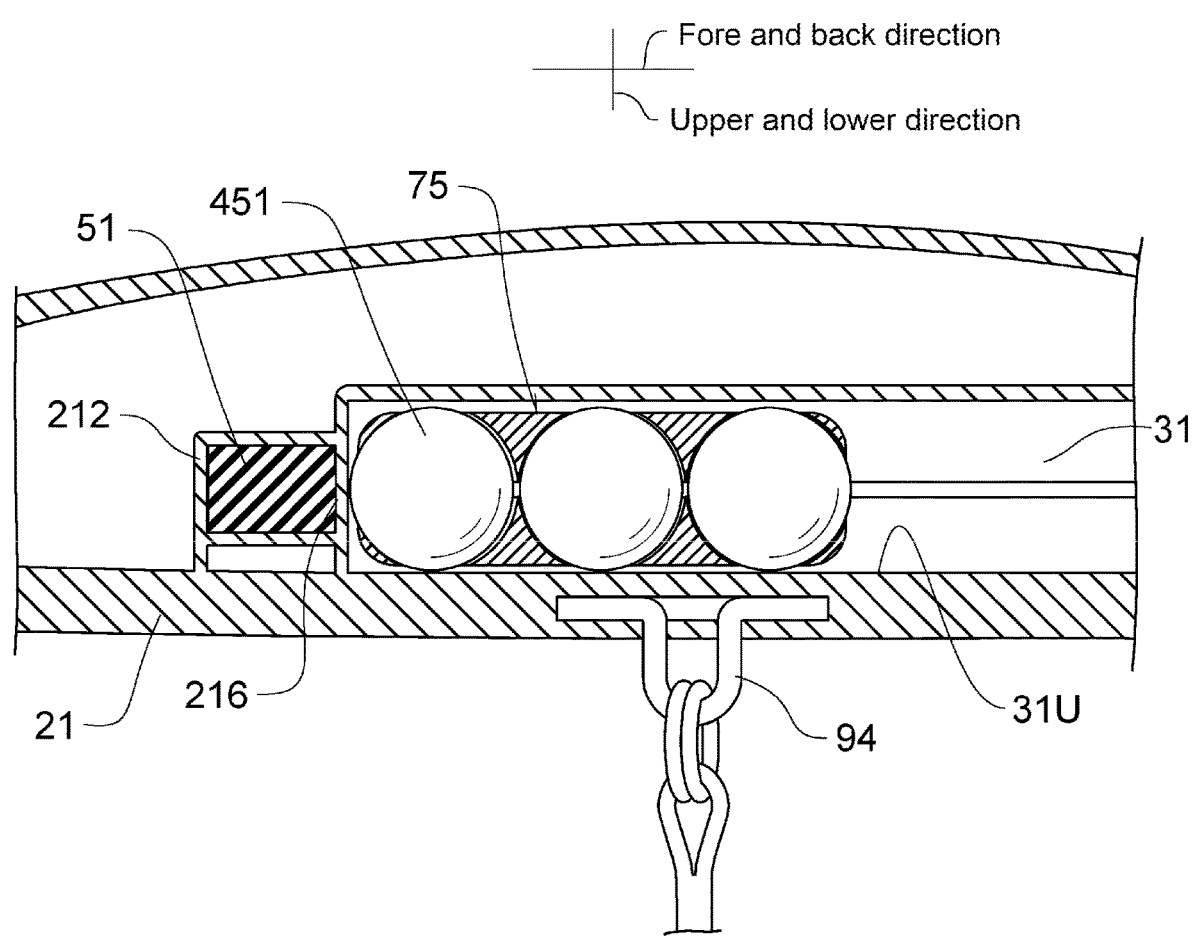
FIG. 30 is an enlarged lateral sectional view of the lure according to Fifth embodiment.

In each of the above embodiments, the case 212 of the body 21 has the opening 213, and the back face of the attachment portion 51 is exposed through the opening 213. However, the prevent invention is not limited to this. For example, as illustrated in FIG. 30, the case 212 may be provided with a partition wall 216 that covers the attachment portion 51. Even when the partition wall 216 is provided, a magnetic force passes through the partition wall 216, and the foremost spherical sinker 451 is attached to the attachment portion 51 by the magnetic force, such that a united sinker 75 is held by the attachment portion 51. The partition wall 216 has such a thickness that the magnetic force acts between the attachment portion 51 and the foremost spherical sinker 451.

Figure 31:
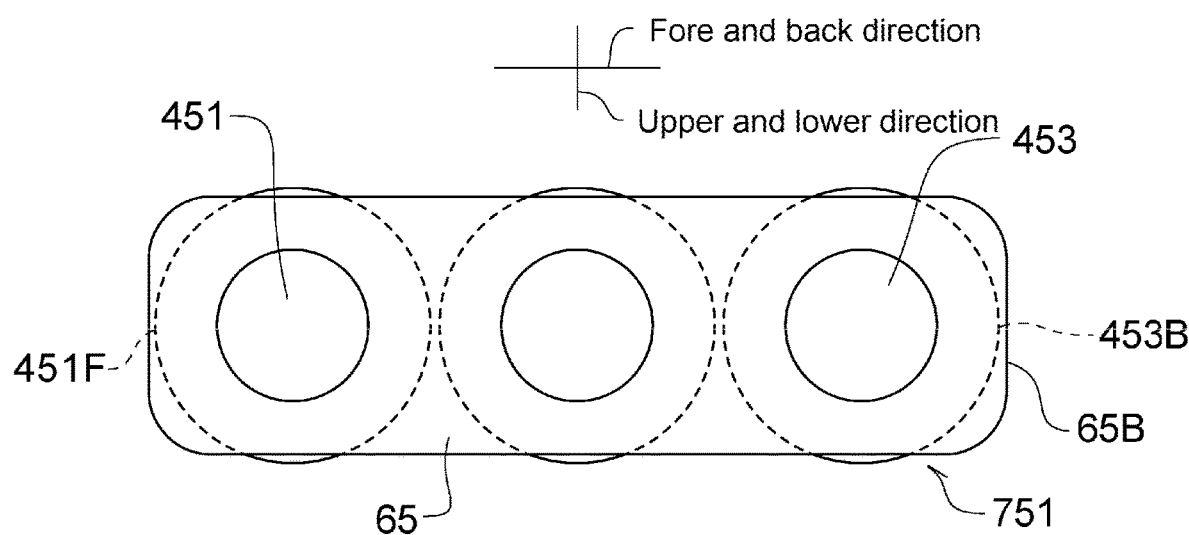
FIG. 31 is a side view of a holding member and a plurality of spherical sinkers (united sinker) held by the holding member in Fifth embodiment.

In each of the above embodiments, the fore end of the foremost spherical sinker is exposed from the holding member. However, for example, as illustrated in FIG. 31, in the united sinker 751, a fore end 451F of the foremost spherical sinker 451 may be covered with a holding member 65. Since the magnetic force passes through the holding member 65, even when the fore end 451F of the foremost spherical sinker 451 is covered with the holding member 65, the foremost spherical sinker 451 is attached to the attachment portion 51 by the magnetic force, such that the united sinker 75 is held by the attachment portion 51.

Further, as illustrated in FIG. 31, in the united sinker 751, a back end 453B of the backmost spherical sinker 453 may be covered with the holding member 65. In this case, when the united sinker 751 moves to the back side, a back outer face 65B of the holding member 65 abuts the cushion portion 91. However, to suppress damage of the holding member 65, as in each of the above embodiments, the back end of the backmost spherical sinker is preferably exposed.

Sixth Embodiment

Figure 32:
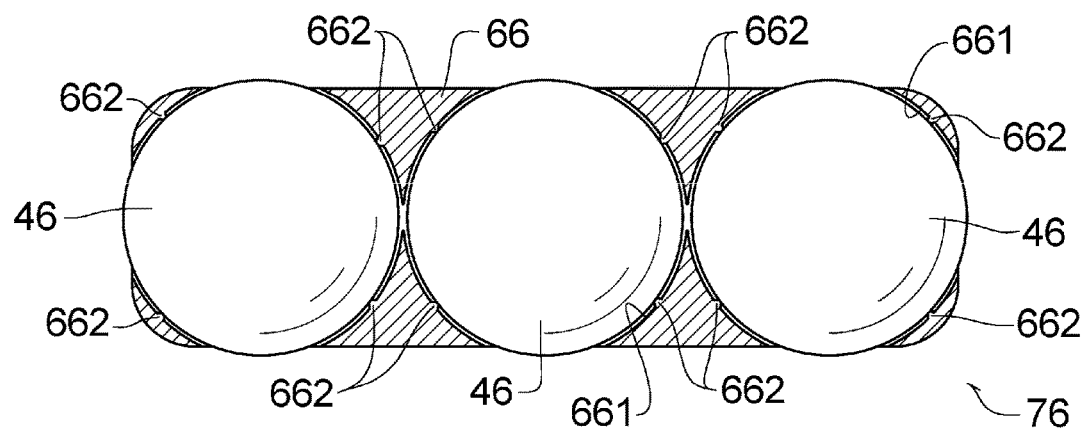
FIG. 32 is a lateral sectional view of a holding member and a plurality of spherical sinkers (united sinker) held by the holding member in Sixth embodiment.

As illustrated in FIG. 32, small protrusions 662 may be formed in an inner face 661 of the holding member 66. The small protrusions 662 protrude inward so as to support respective spherical sinkers 46. In such united sinker 76, a contact area of each spherical sinker 46 and the holding member 66 becomes as small as possible to cause each spherical sinker 46 to rotate so smoothly.

Seventh Embodiment

In each of the above embodiments, the holding member may be configured to be partially swingable.

Figure 33:
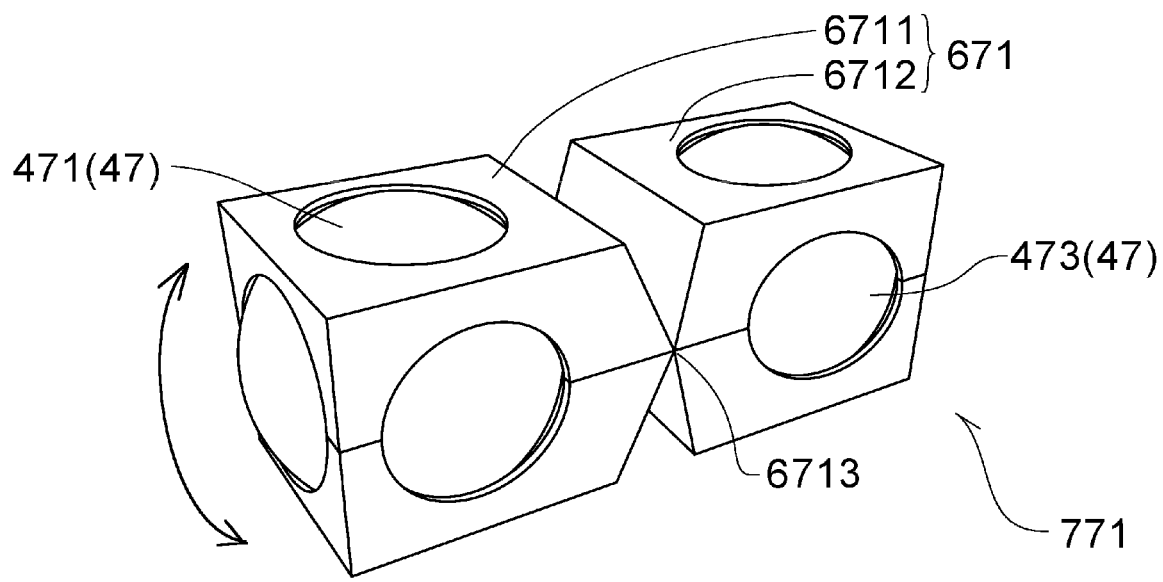
FIG. 33 is a perspective view illustrating a holding member and a plurality of spherical sinkers (united sinker) held by the holding member in a first example in Seventh embodiment.
Figure 34:
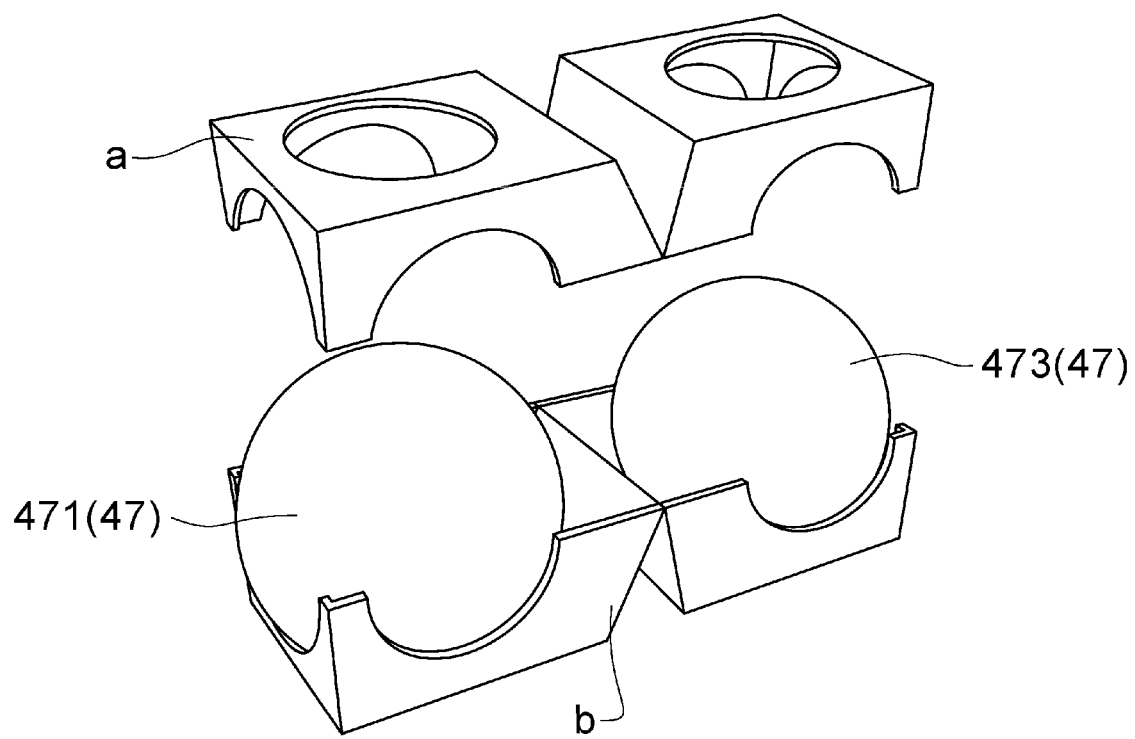
FIG. 34 is an exploded perspective view of the united sinker in the first example.

FIG. 33 illustrates a united sinker 771 in a first example in which a swingable holding member 671 holds spherical sinkers 47, and FIG. 34 illustrates the holding member 671 in the divided state.

As illustrated in FIG. 33, the holding member 671 is configured of a plurality of (two in the illustrated example) divided units 6711, 6712 that is aligned in the fore and back direction and swingably coupled to each other. The divided units 6711, 6712 each rotatably holds one spherical sinker 47. The foremost spherical sinker 471 is held in the divided unit 6711 with the fore end, the left end, the right end, the upper end, and the lower end being exposed, and the backmost spherical sinker 473 is held in the divided unit 6712 with the back end, the left end, the right end, the upper end, and the lower end being exposed. The divided units 6711, 6712 are coupled to each other via a hinge 6713. The divided units 6711, 6712 are formed of a synthetic resin molded piece, for example, and the hinge 6713 is formed of a thinned portion of the resin molded piece. As illustrated in FIG. 34, the divided units 6711, 6712 are acquired by bonding vertically-divided resin molded components a, b to each other.

The holding member 671 swings at the hinge 6713. That is, the divided units 6712 swings relative to the divided unit 6711 in the upper and lower direction, and the divided unit 6711 swings relative to the divided unit 6712 in the upper and lower direction (swinging is represented by an arrow in FIG. 33).

Figure 35:
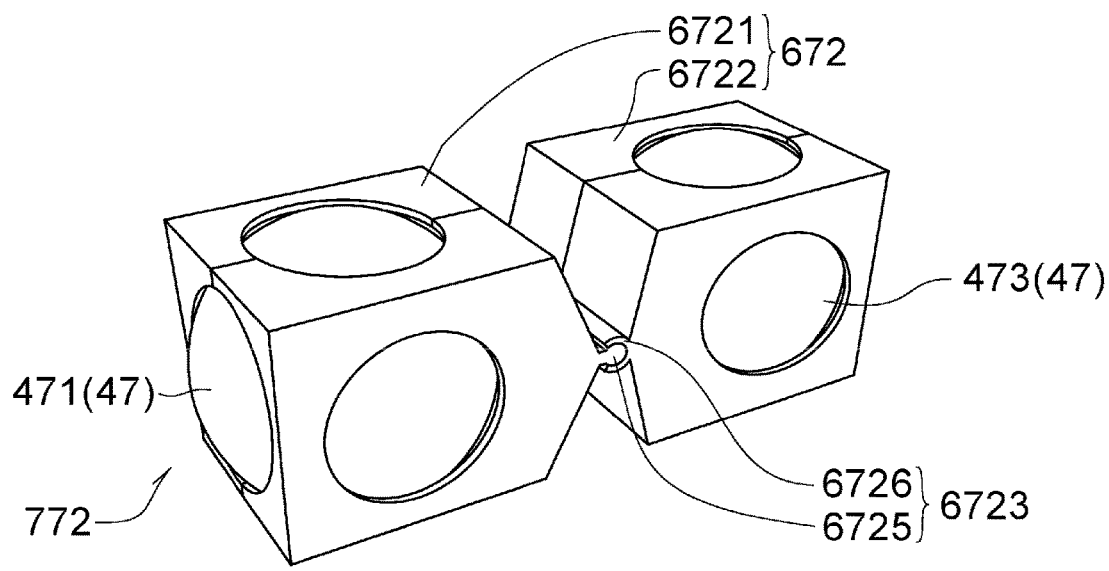
FIG. 35 is a perspective view of the united sinker in a second example in Seventh embodiment.

In FIG. 33, although the hinge is formed of the thinned portion of the resin molded piece, for example, as illustrated in FIG. 35, the hinge may be formed of convex and concave engaged portions.

Figure 36:
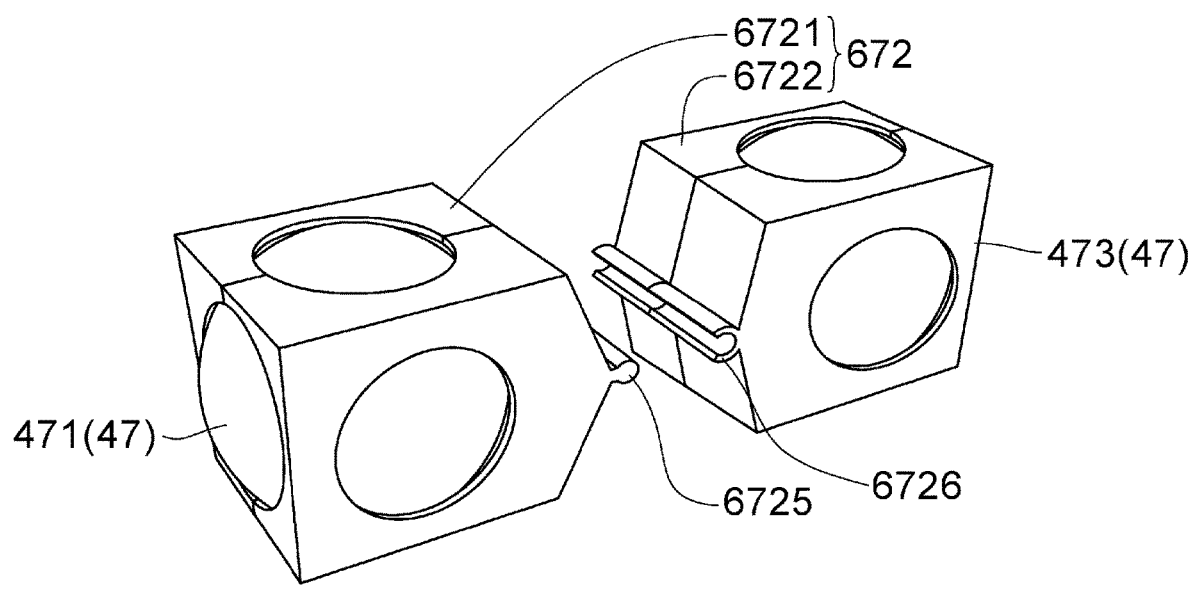
FIG. 36 is an exploded perspective view of the united sinker in the second example.

FIG. 35 illustrates a united sinker 772 of the second example, and FIG. 36 illustrates a holding member 672 in the divided state.

As illustrated in FIG. 35, the holding member 672 is configured of a plurality of (two in the illustrated example) divided units 6721, 6722 that is aligned in the fore and back direction and swingably coupled to each other. As described above, the divided units 6721, 6722 each rotatably hold the spherical sinker 47. The fore divided unit 6721 has a long protrusion 6725 extending in the left and right direction, and the back divided unit 6722 has a long recess 6726 extending in the left and right direction. The long protrusion 6725 engages with the long recess 6726 to constitute a hinge 6723. The holding member 672 also swings at the hinge 6723. That is, as is the case in FIG. 33, the divided unit 6722 swings relative to the divided unit 6721 in the upper and lower direction, and the divided unit 6721 swings relative to the divided unit 6722 in the upper and lower direction.

Although FIG. 33 and FIG. 35 illustrate an example of the case where the divided unit swings in the upper and lower direction, the hinge may be formed such that the divided unit swings in the left and right direction (not illustrated).

Figure 37:
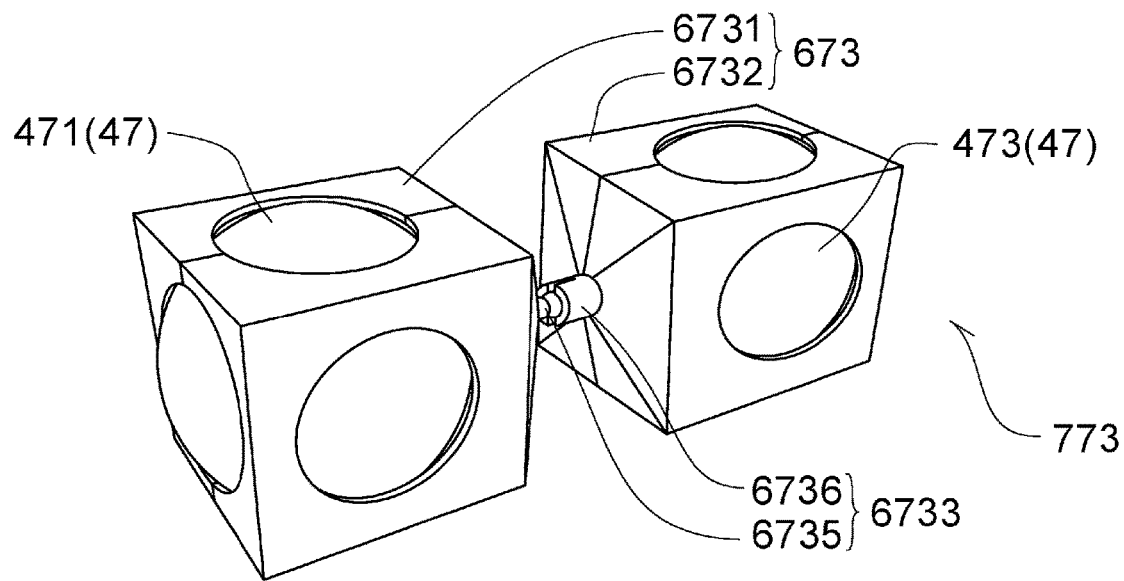
FIG. 37 is a perspective view of the united sinker in a third example in Seventh embodiment.

As illustrated in FIG. 37, the divided units 6731, 6732 of a holding member 673 may be configured to swing in all directions (all orientations).

Figure 38:
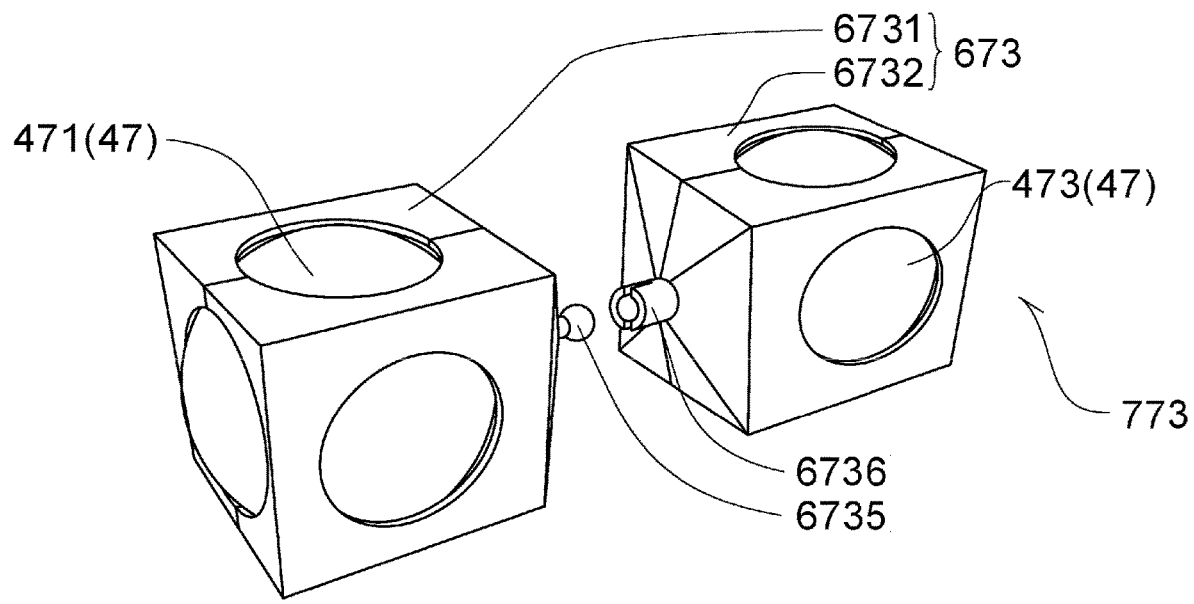
FIG. 38 is an exploded perspective view of the united sinker in the third example.

FIG. 37 illustrates a united sinker 773 of the third example, and FIG. 38 illustrates a holding member 673 in the divided state.

As illustrated in FIG. 37, the holding member 673 is configured of a plurality of (two in the illustrated example) divided units 6731, 6732 that is aligned in the fore and back direction and swingably coupled to each other. As described above, the divided units 6731, 6732 each rotatably hold the spherical sinker 47. The fore divided unit 6731 has a rod-like protrusion 6735 that has a thickened portion at its end and protrude backward, and the back divided unit 6732 has a dent 6736 that undetachably holds the thickened portion. The thickened portion of the rod-like protrusion 6735 engages with the dent 6736 to constitute a hinge 6733 that swings in all directions. The holding member 673 swings at a hinge 6733. That is, the divided unit 6732 swings relative to the divided unit 6731 in all directions including the upper and lower direction and the left and right direction, and the divided unit 6731 swings relative to the divided unit 6732 in all directions including the upper and lower direction and the left and right direction.

Figure 39:
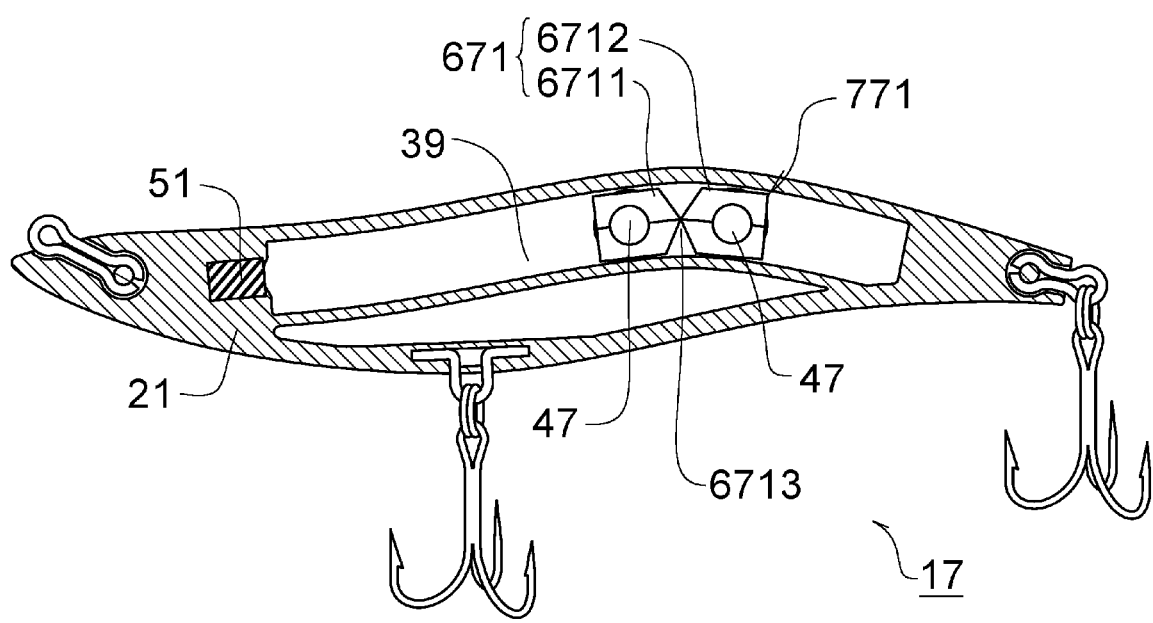
FIG. 39 is a lateral sectional view of the lure in Seventh embodiment in which the united sinker is housed in a curved passage.

As in this embodiment, even when the united sinker 771 having the swinging holding member 671 is housed in a linearly-extending passage or a vertically-curved passage 39 as illustrated in FIG. 39, the united sinker 771 can suitably move in the fore and back direction. That is, as illustrated in FIG. 39, since the holding member 671 is appropriately bent at the hinge 6713 in the curved section of the passage 39, the united sinker 771 rolls without any problem. FIG. 39 illustrates the lure 17 housing the united sinker 771 in the first example. However, the united sinker 772 in the second example and the united sinker 773 in the third example also suitably rolls. Especially, when being housed in the laterally-curved passage (not illustrated), the united sinker 773 swinging in all directions in the third example suitably moves in the fore and back direction.

Eighth Embodiment

The holding member 61 in First embodiment, for example, is constituted by bonding a plurality of components such as a pair of half molded pieces by means of an adhesive or the like. However, the bonding method is not limited to this.

For example, a plurality of components may be structurally fitted or engaged with each other to form the holding member.

Figure 40:
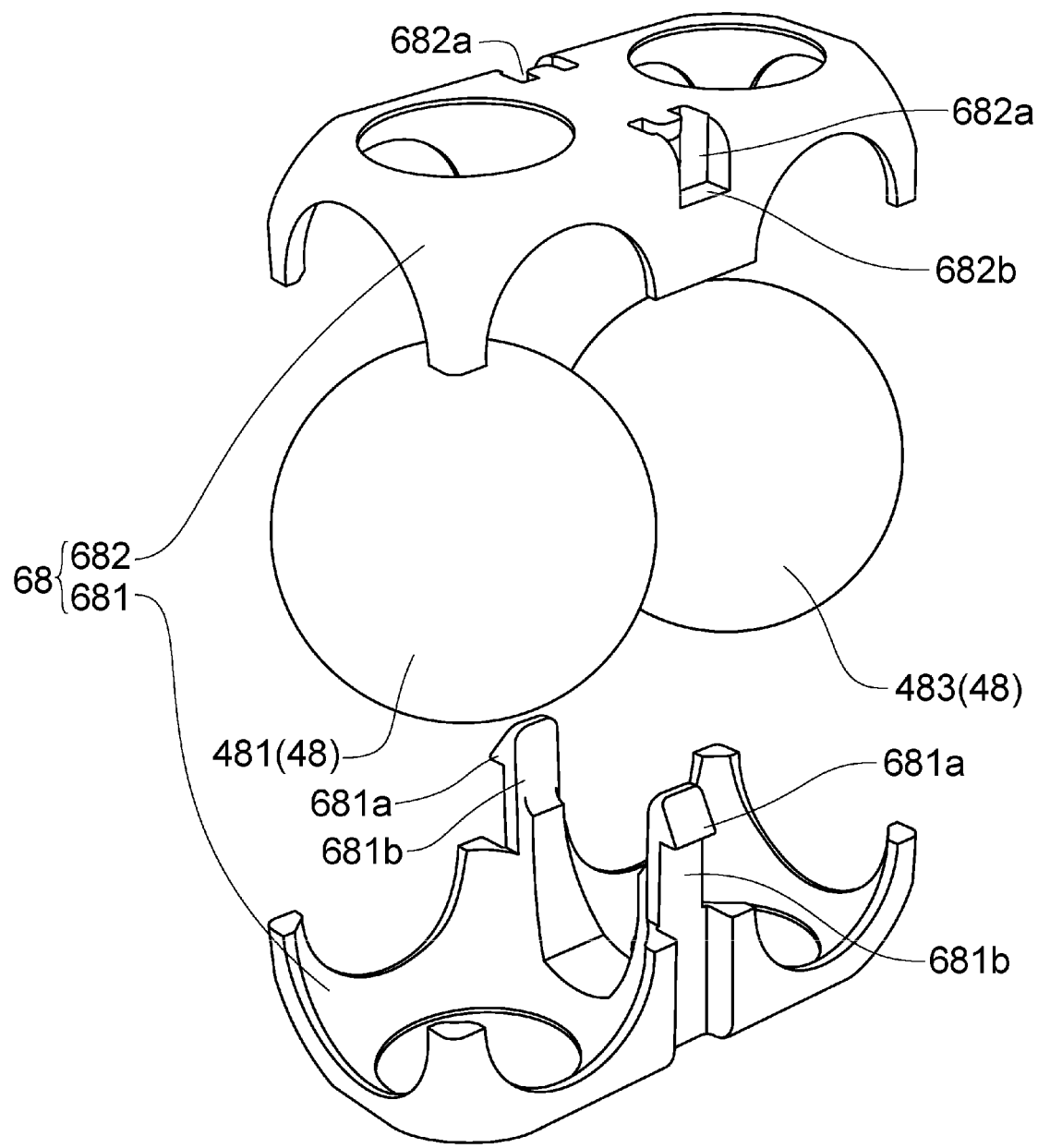
FIG. 40 is an exploded perspective view of the united sinker in Eighth embodiment.
Figure 41:
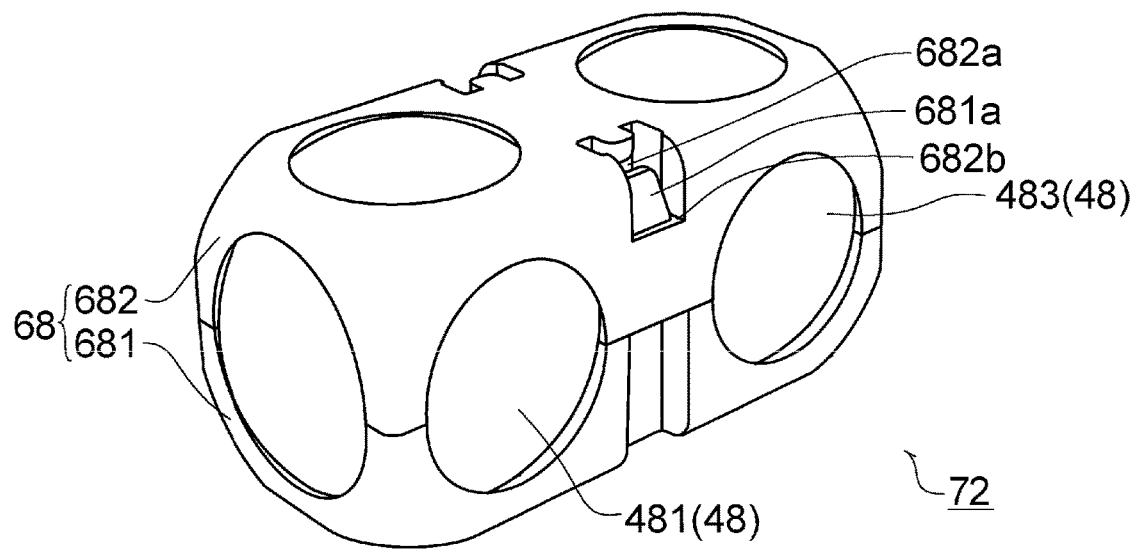
FIG. 41 is a perspective view of the united sinker.

For example, FIG. 40 and FIG. 41 illustrate a holding member 68 configured of a plurality of components that can engage with each other. The holding member 68 in the illustrated example is configured of a pair of upper and lower molded pieces 681, 682 (two components). One molded piece 681 (the lower molded piece in the illustrated example) has an engaging portion 681b having a claw 681a, and the other molded piece 682 (the upper molded piece in the illustrated example) has an engaged portion 682b having a hole 682a engaged with the claw 681a.

As illustrated in FIG. 40, a plurality of spherical sinkers 48 (for example, two spherical sinkers 481, 483) is interposed between the molded pieces 681, 682 to fit the claw 681a of the molded piece 681 into the hole 682a of the molded piece 682. In this manner, as in each of the above embodiments, a united sinker 78 having the holding member 68 and the plurality of spherical sinkers 48 held by the holding member 68 can be acquired. The holding member 68 can be easily made by structurally coupling a plurality of components (for example, molded pieces 681, 682) without using an adhesive or the like.

Ninth Embodiment

In each of the above embodiments, the attachment portion 51 is provided on the front side of the passage 31 and however, the attachment portion 51 may be provided at any position.

Figure 42:
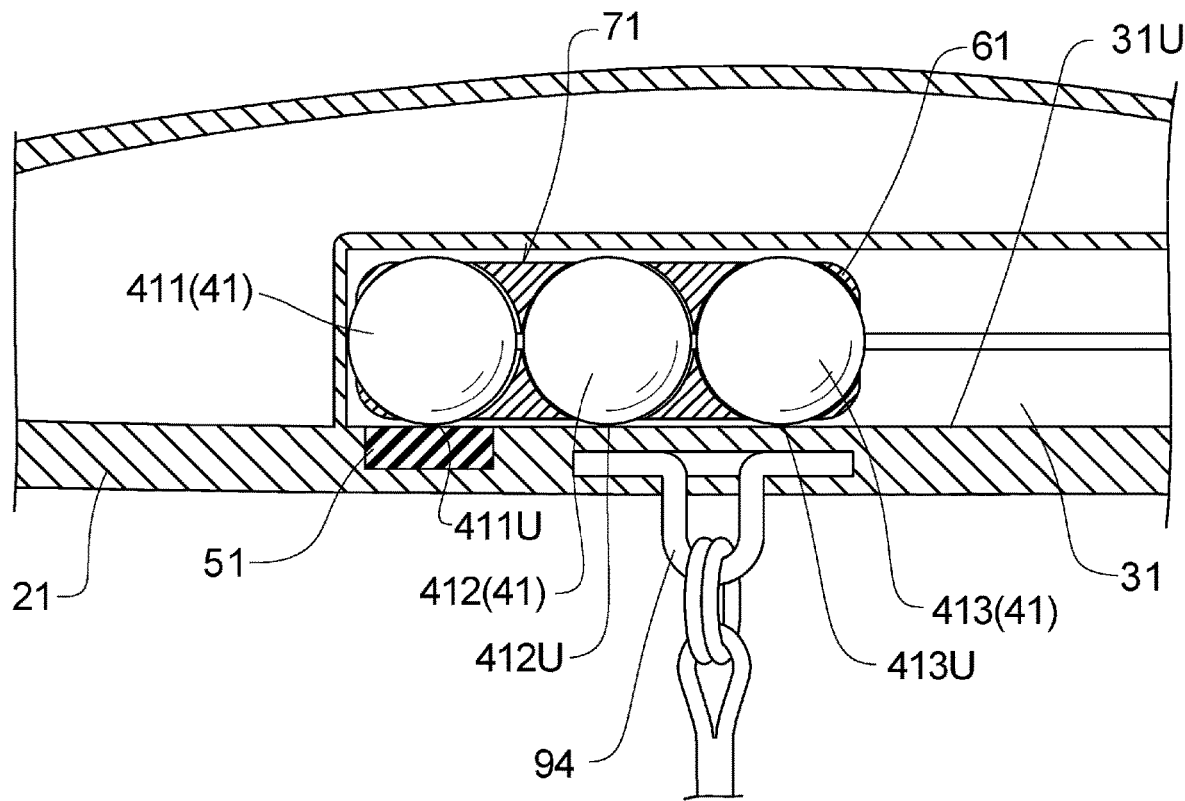
FIG. 42 is an enlarged lateral sectional view of the lure in Ninth embodiment.

For example, as illustrated in FIG. 42, the attachment portion 51 may be provided on the front side of the passage 31 and on the lower face 31U. In this case, as in the illustrated example, the surface of the attachment portion 51 may be flush with the lower face 31U, or although not illustrated, the surface of the attachment portion 51 may protrude or dented from the lower face 31U. When the attachment portion 51 is provided on the lower face 31U, the lower end 411U of the foremost spherical sinker 411 is attached to the attachment portion 51.

Although not illustrated, the attachment portion may be provided on the upper face, the left face, or the right face of the passage 31.

Tenth Embodiment

In each of the above embodiments, all of the spherical sinkers are made of the magnetic material. However, as long as at least the foremost spherical sinker is made of the magnetic material, the spherical sinkers other than the foremost spherical sinker may be partly or wholly made of the non-magnetic material.

In each of the above embodiments, the attachment portion is formed of the magnet, and the foremost spherical sinker is made of the magnetic material. However, the attachment portion may be made of the magnetic material, and the foremost spherical sinker may be formed of the magnet (in this case, the holding member is made of the non-magnetic material). Also in this case, the foremost spherical sinker is attached to the attachment portion by the magnetic force. When the foremost spherical sinker is formed of the magnet, the spherical sinkers other than the foremost spherical sinker are wholly made of the non-magnetic material.

As described in First embodiment, when the holding member can hold three or more spherical sinkers, the intermediate spherical sinker need not be held in the holding member (that is, the intermediate spherical sinker may be omitted).

Figure 43:
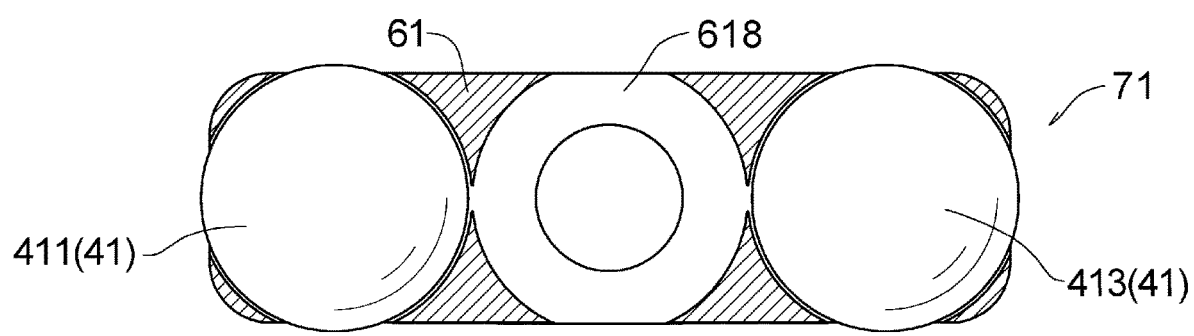
FIG. 43 is a lateral sectional view of the united sinker in Tenth embodiment.

As illustrated in FIG. 43, the united sinker 71 is constituted of the holding member 61, and the foremost spherical sinker 411 and the backmost spherical sinker 413 that are held by the holding member 61, and the holding member 61 has a cavity 618 between the foremost spherical sinker 411 and the backmost spherical sinker 413. The united sinker 71 in which the center of gravity is distributed back and forth can be acquired by forming the cavity 618 between the foremost spherical sinker 411 and the backmost spherical sinker 413.

According to the present invention, two or more embodiments selected among the above-mentioned embodiments may be combined as appropriate and alternatively, one or more structures selected among the above-mentioned embodiments may be replaced with other embodiments.

INDUSTRIAL APPLICABILITY

The lure of the present invention can be used for fishing of various targets such as black bass, sea bass, dorado, octopus, and squid.

| | |
|---|---|
| 11, 13, 17 | Lure |
| 21 | Body |
| 31 | Passage |
| 31U | Lower face of passage |
| 31T | Upper face of passage |
| 31L | Left face of passage |
| 31R | Right face of passage |
| 41, 42, 43, 44, 46, 47, 48 | Spherical sinker |
| 411, 431, 441, 451, 471 | Spherical sinker located foremost |
| 413, 433, 443, 453, 473 | Spherical sinker located backmost |
| 411F | Fore end |
| 411U, 413U | Lower end |
| 411T, 413T | Upper end |
| 411L, 413L | Left end |
| 411R, 413R | Right end |
| 51 | Attachment portion |
| 61, 62, 63, 64, 65, 66, 671, 672, 673, 68 | Holding member |

The invention claimed is:

1. A lure comprising:
a body;
a passage formed in the body in a fore and back direction, the passage having a lower face;
a plurality of spherical sinkers that moves in the passage, the plurality of spherical sinkers being independent of each other, aligned in the fore and back direction and housed in the passage;
a holding member that holds the plurality of spherical sinkers together such that the spherical sinker located foremost and the spherical sinker located backmost each independently rotate while being in point-contact with the lower face of the passage; and
an attachment portion provided on the passage, wherein the spherical sinker which is located foremost and held by the holding member is attached to the attachment portion by a magnetic force,
wherein:
the holding member and the plurality of spherical sinkers move together in the passage,
a fore end of the spherical sinker located foremost is exposed from the holding member,
the fore end of the spherical sinker is attached to the attachment portion, and
the fore end of the spherical sinker is an intersection point between the surface of the spherical sinker and an X axis that passes through the center of the spherical sinker and extends in the fore and back direction.

2. The lure according to claim 1, wherein
the passage has an upper face and the lower face that are formed in the body in the fore and back direction, and
an upper end and a lower end of the spherical sinker located foremost, and an upper end and a lower end of the spherical sinker located backmost each are exposed from the holding member.

3. The lure according to claim 2, wherein
the passage is configured of the upper face, the lower face, a left face, and a right face that are formed in the body in the fore and back direction, and
a left end and a right end of the spherical sinker located foremost, and a left end and a right end of the spherical sinker located backmost each are exposed from the holding member.

4. The lure according to claim 1, wherein
the passage is configured of an upper face, the lower face, a left face, and a right face that are formed in the body in the fore and back direction, and
a left end and a right end of the spherical sinker located foremost, and a left end and a right end of the spherical sinker located backmost each are exposed from the holding member.

5. The lure according to claim 1, wherein
the fore end of the spherical sinker is directly attached to the attachment portion.

6. The lure according to claim 1, wherein
the lower face of the passage is a flat face.

* * * * *